(12) United States Patent
Lee et al.

(10) Patent No.: US 12,075,140 B2
(45) Date of Patent: Aug. 27, 2024

(54) DUAL CAMERA MODULE AND OPTICAL DEVICE

(71) Applicant: LG INNOTEK CO., LTD., Seoul (KR)

(72) Inventors: Jun Taek Lee, Seoul (KR); Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/346,941

(22) Filed: Jul. 5, 2023

(65) Prior Publication Data

US 2023/0353848 A1 Nov. 2, 2023

Related U.S. Application Data

(63) Continuation of application No. 18/069,707, filed on Dec. 21, 2022, now Pat. No. 11,743,562, which is a
(Continued)

(30) Foreign Application Priority Data

Jul. 13, 2016 (KR) .......................... 10-2016-0088567
Jul. 18, 2016 (KR) .......................... 10-2016-0090565

(51) Int. Cl.
*H04N 23/45* (2023.01)
*G02B 7/105* (2021.01)
(Continued)

(52) U.S. Cl.
CPC ............. *H04N 23/45* (2023.01); *G02B 7/105* (2013.01); *G03B 3/10* (2013.01); *G03B 11/04* (2013.01);
(Continued)

(58) Field of Classification Search
CPC ........ H04N 23/45; H04N 23/51; H04N 23/54; G02B 7/105; G02B 13/001; G02B 7/021;
(Continued)

(56) References Cited

U.S. PATENT DOCUMENTS 9,774,787 B2 9/2017 Miller et al.
9,781,345 B1 10/2017 Miller et al.
(Continued)

FOREIGN PATENT DOCUMENTS

CN 102819086 A 12/2012
CN 203933331 U 11/2014
(Continued)

OTHER PUBLICATIONS

International Search Report dated Oct. 13, 2017 in International Application No. PCT/KR2017/007314.
(Continued)

*Primary Examiner* — Kelly L Jerabek
(74) *Attorney, Agent, or Firm* — Saliwanchik, Lloyd & Eisenschenk

(57) ABSTRACT

The present embodiment relates to a dual camera module comprising a first camera module and a second camera module, wherein: a first magnet unit of the first camera module includes a first magnet and a second magnet, both disposed opposite to each other on a side surface of a first housing; a second magnet unit of the second camera module includes a third to a sixth magnet arranged on four respective corners of a second housing; a third magnet unit is disposed on a side surface of the first housing facing the second housing; the third magnet unit is disposed between the first magnet and the second magnet; and the third magnet unit is smaller than the first magnet and is disposed on a virtual line connecting an optical axis of the first camera module and an optical axis of the second camera module.

20 Claims, 17 Drawing Sheets

Related U.S. Application Data continuation of application No. 17/307,545, filed on May 4, 2021, now Pat. No. 11,582,376, which is a continuation of application No. 16/870,462, filed on May 8, 2020, now Pat. No. 11,032,461, which is a continuation of application No. 16/317,764, filed as application No. PCT/KR2017/007314 on Jul. 7, 2017, now Pat. No. 10,694,092.

(51) Int. Cl.
| | | |
|---|---|---|
| G03B 3/10 | (2021.01) | |
| G03B 11/04 | (2021.01) | |
| G03B 17/02 | (2021.01) | |
| H02K 1/17 | (2006.01) | |
| H04N 23/51 | (2023.01) | |
| H04N 23/54 | (2023.01) | |

(52) U.S. Cl.
CPC ............... *G03B 17/02* (2013.01); *H02K 1/17* (2013.01); *H04N 23/51* (2023.01); *H04N 23/54* (2023.01)

(58) Field of Classification Search
CPC ........ G02B 7/023; G02B 27/646; G03B 3/10; G03B 11/04; G03B 17/02; G03B 2205/0015; G03B 2205/0069; G03B 5/00; H02K 1/17
See application file for complete search history.

(56) References Cited

U.S. PATENT DOCUMENTS

| | | | |
|---|---|---|---|
| 10,082,638 | B2 | 9/2018 | Park et al. |
| 10,288,897 | B2 | 5/2019 | Bachar et al. |
| 10,359,597 | B2 | 7/2019 | Wu et al. |
| 10,382,698 | B2 | 8/2019 | Sharma et al. |
| 10,502,974 | B2 | 12/2019 | Hu et al. |
| 10,509,194 | B2 | 12/2019 | Lee |
| 10,539,759 | B2 | 1/2020 | Wu et al. |
| 10,694,092 | B2 | 6/2020 | Lee et al. |
| 10,830,980 | B2 | 11/2020 | Park et al. |
| 10,983,303 | B2 | 4/2021 | Jung et al. |
| 11,032,461 | B2 | 6/2021 | Lee et al. |
| 11,582,376 | B2 | 2/2023 | Lee et al. |
| 11,743,562 | B2 * | 8/2023 | Lee ................... H04N 23/45 348/218.1 |
| 2013/0044382 | A1 | 2/2013 | Phoon et al. |
| 2013/0107068 | A1 | 5/2013 | Kim et al. |
| 2013/0242181 | A1 | 9/2013 | Phoon et al. |
| 2014/0177056 | A1 | 6/2014 | Hayashi et al. |
| 2015/0070781 | A1 | 3/2015 | Cheng et al. |
| 2015/0103195 | A1 | 4/2015 | Kwon et al. |
| 2015/0253583 | A1 | 9/2015 | Cho et al. |
| 2015/0296112 | A1 | 10/2015 | Park et al. |
| 2015/0316744 | A1 | 11/2015 | Chen |
| 2015/0316745 | A1 | 11/2015 | Chen et al. |
| 2016/0018720 | A1 | 1/2016 | Bachar et al. |
| 2016/0044250 | A1 | 2/2016 | Shabtay et al. |
| 2016/0170170 | A1 | 6/2016 | Go et al. |
| 2016/0316150 | A1 | 10/2016 | Eromäki |
| 2017/0094180 | A1 | 3/2017 | Miller et al. |
| 2017/0315376 | A1 | 11/2017 | Hu et al. |
| 2017/0357144 | A1 | 12/2017 | Kim et al. |
| 2018/0059356 | A1 | 3/2018 | Wu et al. |
| 2018/0100983 | A1 | 4/2018 | Kao et al. |

FOREIGN PATENT DOCUMENTS

| | | |
|---|---|---|
| CN | 104423118 A | 3/2015 |
| CN | 104902149 A | 9/2015 |
| CN | 104932174 A | 9/2015 |
| CN | 204667028 U | 9/2015 |
| CN | 104993668 A | 10/2015 |
| CN | 104995541 A | 10/2015 |
| CN | 204807890 U | 11/2015 |
| CN | 105739051 A | 7/2016 |
| CN | 105739054 A | 7/2016 |
| EP | 2 560 367 A1 | 2/2013 |
| KR | 10-2011-0135502 A | 12/2011 |
| KR | 10-2012-0021083 A | 3/2012 |
| KR | 10-2016-0005927 A | 1/2016 |
| KR | 10-1620020 B1 | 5/2016 |
| WO | 2013/006811 A1 | 1/2013 |
| WO | 2015/124966 A1 | 8/2015 |
| WO | 2016/156996 A1 | 10/2016 |

OTHER PUBLICATIONS

Supplementary European Search Report dated Dec. 11, 2019 in European Application No. 17827885.9.
Notice of Allowance dated Feb. 10, 2020 in U.S. Appl. No. 16/317,764.
Office Action dated Sep. 2, 2020 in Chinese Application No. 201780043318.X.
Office Action dated Sep. 14, 2020 in U.S. Appl. No. 16/870,462.
Notice of Allowance dated Feb. 5, 2021 in U.S. Appl. No. 16/870,462.
Office Action dated Feb. 7, 2022 in Chinese Application No. 202110580116.7.
Office Action dated Feb. 21, 2022 in Chinese Application No. 202110578602.5.
European Search Report dated Mar. 4, 2022 in European Application No. 21191824.8.
Office Action dated Apr. 26, 2022 in U.S. Appl. No. 17/307,545.
Notice of Allowance dated Oct. 13, 2022 in U.S. Appl. No. 17/307,545.
Notice of Allowance dated Apr. 4, 2023 in U.S. Appl. No. 18/069,707.

* cited by examiner

DUAL CAMERA MODULE AND OPTICAL DEVICE

CROSS-REFERENCE TO RELATED APPLICATIONS

This application is a continuation of U.S. application Ser. No. 18/069,707, filed Dec. 21, 2022; which is a continuation of U.S. application Ser. No. 17/307,545, filed May 4, 2021, now U.S. Pat. No. 11,582,376, issued Feb. 14, 2023; which is a continuation of U.S. application Ser. No. 16/870,462, filed May 8, 2020, now U.S. Pat. No. 11,032,461, issued Jun. 8, 2021; which is a continuation of U.S. application Ser. No. 16/317,764, filed Jan. 14, 2019, now U.S. Pat. No. 10,694,092, issued Jun. 23, 2020; which is the U.S. national stage application of International Patent Application No. PCT/KR2017/007314, filed Jul. 7, 2017, which claims the benefit under 35 U.S.C. § 119 of Korean Application Nos. 10-2016-0088567, filed Jul. 13, 2016; and 10-2016-0090565, filed Jul. 18, 2016; the disclosures of each of which are incorporated herein by reference in their entirety.

TECHNICAL FIELD

The teachings in accordance with exemplary and non-limiting embodiments of this invention relate generally to a dual camera module and an optical device.

BACKGROUND ART

This section provides background information related to the present invention, which is not necessarily prior art.

Concomitant with generalization of wide use of various mobile terminals, and commercialization of wireless internet services, demands by consumers related to mobile terminals are also diversified to allow various types of peripheral devices to be mounted on the mobile terminals.

Among the representative items thereof, there is mentioned a camera module photographing a subject in a picture or a video. The camera module may generally include two types of camera module, one of which is an AF (Auto Focus) camera module equipped with an AF function automatically adjusting a focus in response to a distance to a subject, and the other of which is an OIS (Optical Image Stabilization) camera module equipped with an OIS function which is a function to correct a handshake of a user during photographing.

Recently, researches are being briskly waged on a dual camera module in which an AF camera module and an OIS camera module are arranged in parallel. However, the said dual camera module suffers from disadvantages of a magnet of an OIS camera module being disengaged from a normal position due to being influenced by a magnet of an AF camera module.

Furthermore, there are many instances where a peripheral device such as a receiver inside an optical device is arranged near to the dual camera module, and problems occur to receipt of signals by the peripheral device due to an EMI (Electro Magnetic Interference) generated from the dual camera module.

DETAILED DESCRIPTION OF THE INVENTION

Technical Subject

In order to solve the aforementioned disadvantages/problems, an exemplary embodiment of the present invention is to provide a dual camera module configured to minimize an influence of magnetic force affecting on a magnet of an OIS camera module by a magnet of an AF camera module. Moreover, an exemplary embodiment of the present invention is to provide a dual camera module configured to inhibit an EMI from being generated. Furthermore, an exemplary embodiment of the present invention is to provide an optical device comprising the said dual camera module.

Technical Solution

A dual camera module, comprising:
a first camera module comprising a first housing, a first bobbin disposed at an inside of the first housing, a first magnet unit disposed at the first housing and a first coil disposed at the first bobbin to mutually and electromagnetically interact with the first magnet unit;
a second camera module comprising a second housing spaced apart from the first housing, a second bobbin disposed at an inside of the second housing, a second magnet unit disposed at the second housing and a second coil disposed at the second bobbin to mutually and electromagnetically interact with the second coil, wherein
the first magnet unit comprises a first magnet and a second magnet, both disposed opposite to each other on a side surface of the first housing,
the second magnet comprises a third to a sixth magnet arranged on four respective corners of a second housing,
a third magnet unit is disposed on a side surface of the first housing facing the second housing, and the third magnet unit is disposed between the first magnet and the second magnet, and
the third magnet unit is smaller than the first magnet and is disposed on a virtual line connecting an optical axis of the first camera module and an optical axis of the second camera module.

Preferably, but not necessarily, the first magnet and the second magnet may be symmetrical based on a center of an optical axis of the first camera module, and each of the first magnet and the second magnet may take a flat plate shape.

Preferably, but not necessarily, the third to sixth magnet may be symmetrical based on an optical axis of second camera module, and the third to sixth magnet may take a cylindrical shape having a greater inside than an outside.

Preferably, but not necessarily, the first housing may comprise a first side surface disposed with the first magnet, a second side surface disposed with the third magnet unit and a third side surface disposed with the second magnet, and
when, viewed from an upper surface, a length of the third magnet unit to a direction parallel with the second side surface may be shorter than a discrete distance between the third magnet and the sixth magnet.

Preferably, but not necessarily, the first housing may comprise a first side surface disposed with the first magnet, a second side surface disposed with the third magnet and a third side surface disposed with the second magnet, and
when, viewed from an upper surface, a length of the third magnet unit to a direction parallel with the second side surface may be less than 50% of a length of the first magnet.

Preferably, but not necessarily, the first camera module may further comprise a fourth magnet unit disposed at the first housing and so disposed as to be symmetrical with the third magnet unit based on an optical axis of the first camera module.

Preferably, but not necessarily, the second camera module may further comprise a base disposed at a lower side of the second housing, and a third coil disposed on the base to mutually and electromagnetically interact with the second magnet unit.

Preferably, but not necessarily, the first housing of the first camera module may be a first cover member, and the second camera module may further comprise a second cover member spaced apart from the first cover member while accommodating the second housing, and a discrete distance between the second cover member and the first cover member may be within 4 mm.

Preferably, but not necessarily, the first housing of first camera module may be a first cover member, and the second camera module may further comprise a second cover member spaced apart from the first cover member while accommodating the second housing, and a discrete distance between the second cover member and the first cover member may be within 2 mm.

Preferably, but not necessarily, the first cover member and the second cover member may be non-magnetic substances.

Preferably, but not necessarily, the first cover member may comprise a first side plate facing the second cover member, the second cover member may comprise a second side plate facing the first side plate and a length of second side plate to a lengthwise direction may be within 1.5 times the length of the first side plate to a lengthwise direction.

An optical device according to an exemplary embodiment of present invention may comprise:

a main body;
a dual camera module disposed at the main body to photograph an image of a subject; and
a display part disposed at the main body to output the image photographed by the dual camera module, wherein
the dual camera module may comprise a first camera module comprising a first housing, a first bobbin disposed at an inside of the first housing, a first magnet unit disposed at the first housing and a first coil disposed at the first bobbin to mutually and electromagnetically interact with the first magnet unit; a second camera module comprising a second housing spaced apart from the first housing, a second bobbin disposed at an inside of the second housing, a second magnet unit disposed at the second housing and a second coil disposed at the second bobbin to mutually and electromagnetically interact with the second coil, wherein the first magnet unit comprises a first magnet and a second magnet, both disposed opposite to each other on a side surface of the first housing, the second magnet comprises a third to a sixth magnet arranged on four respective corners of a second housing, a third magnet unit is disposed on a side surface of the first housing facing the second housing, and the third magnet unit is disposed between the first magnet and the second magnet, and the third magnet unit is smaller than the first magnet and is disposed on a virtual line connecting an optical axis of the first camera module and an optical axis of the second camera module.

A dual camera module according to an exemplary embodiment of present invention may comprise:

a first camera module comprising a first cover member, a first housing disposed at an inside of the first cover member, a first bobbin disposed at an inside of the first housing, a first magnet unit disposed at the first housing, and a first coil disposed at the first bobbin to mutually and electromagnetically interact with the first magnet unit;
a second camera module comprising a second cover member spaced apart from the first cover member, a second housing disposed at an inside of the second cover member, a second bobbin disposed at an inside of the second housing, a second magnet unit disposed at the second housing and a second coil disposed at the second bobbin to mutually and electromagnetically interact with the second magnet unit, wherein
the first magnet unit comprises a first magnet and a second magnet, both disposed opposite to each other on a side surface of the first housing,
the second magnet comprises a third to a sixth magnet arranged on four respective corners of the second housing,
the first cover member comprises a first side plate facing the second cover member, a second side plate disposed opposite to the first side plate and a third side plate and a fourth side plate disposed between the first side plate and the second side plate, and the first side plate is disposed with a first shield member, which is a magnetic substance.

Preferably, but not necessarily, the second side plate may be disposed with a second shield member, which is a magnetic substance.

Preferably, but not necessarily, the second side plate may be disposed with a second shield member, which is a magnetic substance, the third side plate may be disposed with a third shield member, which is a magnetic substance, and the fourth side plate may be disposed with a fourth shield member, which is a magnetic substance, and may be formed with an integral shield member formed by being connected at distal ends of mutually adjacent shield members.

Preferably, but not necessarily, the first shield member may be formed with a flat plate shape, with an inside surface contacting an outside surface of the first side plate, and a length to a lengthwise direction being same as or longer than a length of the first side plate to a lengthwise direction.

Preferably, but not necessarily, the first shield member may be formed with a flat plate shape, with an inside surface contacting an outside surface of the first side plate, and a length to a widthwise direction being same as or longer than a length of the first side plate to a lengthwise direction.

Preferably, but not necessarily, the first magnet and the second magnet may be symmetrical about an optical axis of the first camera module, and each of the first magnet and the second magnet may take a flat plate shape.

Preferably, but not necessarily, the third to the sixth magnet may be symmetrical about an optical axis of the second camera module, and each of the third to the sixth magnet may take a cylindrical shape greater at an inside surface than at an outside surface.

Preferably, but not necessarily, a side surface of the first housing may comprise a first side surface facing the second housing, a second side surface disposed opposite to the first side surface, and a third and a fourth side surface disposed between the first side surface and the second side surface, and the third side surface may be disposed with the first magnet, and the fourth side surface may be disposed with the second magnet.

Preferably, but not necessarily, the second camera module may further comprise a base disposed at a lower side of the second housing, and a third coil disposed on the base to mutually and electromagnetically interact with the second magnet unit, and the second bobbin may be driven or tilted to a direction perpendicular to an optical axis by the electromagnetic interaction between the second magnet unit and the third coil.

Preferably, but not necessarily, the second cover member may comprise a fifth side plate facing the first cover member, and a discrete distance between the first side plate and the fifth side plate may be within 4 mm.

Preferably, but not necessarily, the first cover member and the second cover member may be a non-magnetic substance.

An optical device according to an exemplary embodiment of present invention comprises:
- a main body;
- a dual camera module disposed at the main body to photograph an image of a subject;
- a display part disposed at the main body to output the image photographed by the dual camera module; and
- a receiver receiving an electronic signal, wherein the dual camera module includes:
  - a first camera module comprising a first cover member, a first housing disposed at an inside of the first cover member, a first bobbin disposed at an inside of the first housing, a first magnet unit disposed at the first housing, and a first coil disposed at the first bobbin to mutually and electromagnetically interact with the first magnet unit; a second camera module comprising a second cover member spaced apart from the first cover member, a second housing disposed at an inside of the second cover member, a second bobbin disposed at an inside of the second housing, a second magnet unit disposed at the second housing and a second coil disposed at the second bobbin to mutually and electromagnetically interact with the second magnet unit, wherein the first magnet unit comprises a first magnet and a second magnet, both disposed opposite to each other on a side surface of the first housing,
  - the second magnet comprises a third to a sixth magnet arranged on four respective corners of the second housing, the first cover member comprises a first side plate facing the second cover member, a second side plate disposed opposite to the first side plate, and a third side plate and a fourth side plate disposed between the first side plate and the second side plate, and the second side plate is disposed with a second shield member, which is a magnetic substance, and the receiver is spaced apart from the second side plate on a second side plate side of the first camera module.

Advantageous Effects

According to the exemplary embodiments of present invention, an influence of magnetic force applied by a magnet of AF camera module to a magnet of OIS camera module can be minimized by arrangements and shapes of first, second, third and fourth magnet units and first, second, third and fourth shield members. As a result, the magnet of OIS camera module is inhibited from being deviated from a normal position due to influence of magnet of the AF camera module. Furthermore, an influence of magnetic force affecting on peripheral devices of dual camera module can be shielded, whereby a discrete distance between the AF camera module and the OIS camera module can be minimally arranged.

BEST MODE

Figure 1:
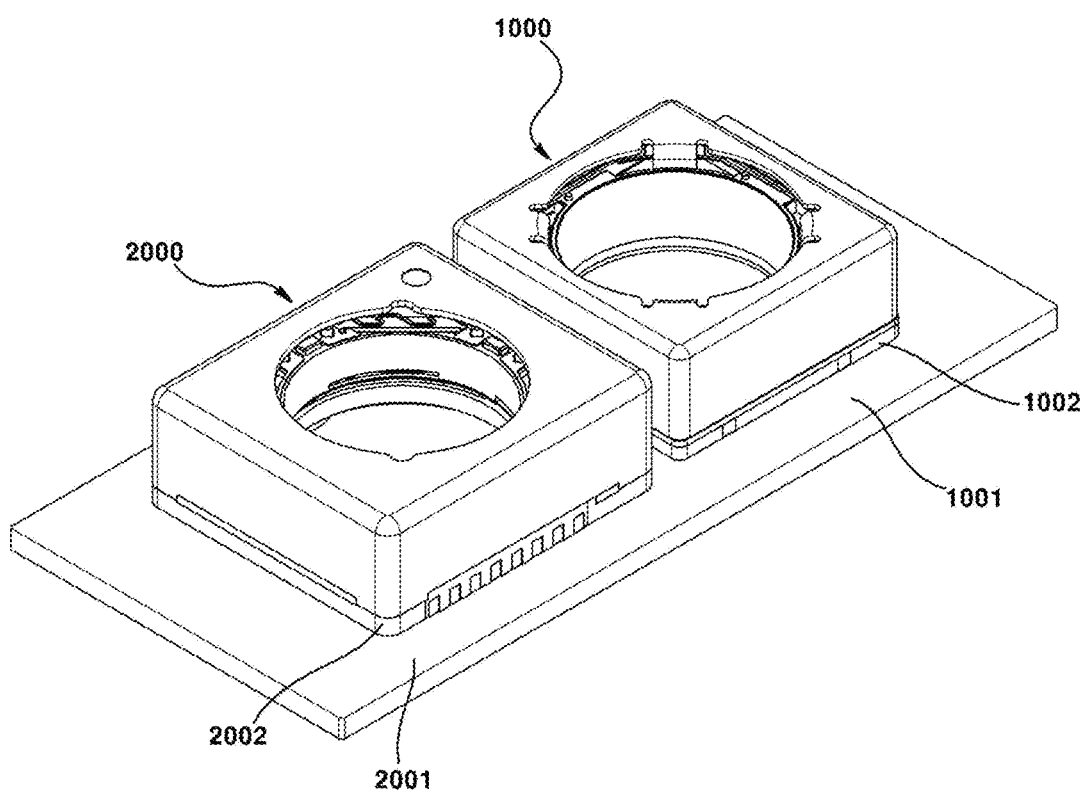
FIG. 1 is a perspective view of a dual camera module according to an exemplary embodiment of present invention.

Some exemplary embodiments of present invention will be described in detail with reference to the accompanying drawings. In describing a reference numeral for each element, a same reference numeral will be designated, if possible, for the same element, albeit being differently indicated on other drawings. Furthermore, a detailed explanation of some elements will be omitted in explaining exemplary embodiments of the present invention if obstructed in the understanding of exemplary embodiment of present invention.

In describing elements in the exemplary embodiments of the present invention, the terms, first, second, A, B (a), (b), etc., may be used. These terms may be used only to distinguish one element from another element, and the nature, order or sequence is not restricted by these terms. When an element is referred to as being "accessed to", "coupled to," or "connected to," another element, it should be appreciated that the element may be directly accessed, connected or coupled to the other element, or intervening elements may be present therebetween.

The optical axis direction used hereinunder is defined as an optical axis direction of a lens module coupled to a lens driving device. Meantime, the "optical axis direction" may be interchangeably used with a vertical direction and a z axis direction.

The 'auto focus function' used hereinafter may be defined as a function of adjusting a focus relative to a subject by adjusting a distance to an image sensor through movement of lens module to an optical axis direction in response to a distance to the subject, whereby a clear image of a subject can be obtained on an image sensor. Meantime, an 'auto focus' may be interchangeably used with an 'AF (Auto Focus)'.

The "handshake correction function" hereinafter used may be defined as a function to move or tilt a lens module to a direction perpendicular to an optical axis direction in order to offset vibration (movement) generated from an image sensor by an outside force. Meantime, the "handshake correction" may be interchangeably used with an "OIS (Optical Image Stabilization)".

Hereinafter, configuration of an optical device according to an exemplary embodiment will be described.

The optical device according to an exemplary embodiment of the present invention may be any one of a hand phone, a mobile phone, a smart phone, a portable smart device, a digital camera, a notebook computer (laptop computer), a digital broadcasting terminal, a PDA (Personal Digital Assistant), a PMP (Portable Multimedia Player) and a navigation device. However, the present invention is not limited thereto, and may comprise any device capable of photographing an image or a photograph.

The optical device according to an exemplary embodiment may comprise a main body (not shown), a dual camera module and a display part (not shown). However, any one or more of the elements in main body, the dual camera module and the display part may be omitted or changed from the optical device.

The main body may form an external shape of an optical device. The main body may comprise a cubic shape, for example. However, the present invention is not limited thereto. As a modification, the main body may be partially rounded. The main body may accommodate a dual camera module. One surface of a main body may be disposed with a display part.

The dual camera module may be disposed on the main body. The dual camera module may be disposed at one surface of main body. At least one portion of the dual camera module may be accommodated into the main body. The dual camera module may photograph an image of a subject.

The display part may be disposed on the main body. The display part may be disposed at one surface of main body. That is, the display part may be disposed on a same surface as that of dual camera module. Alternatively, the display part may be disposed at the other surface of main body. The display part may be disposed on a surface disposed at an opposite surface of a surface disposed with the dual camera module. The display part may output an image photographed by the dual camera module.

A receiver (300) may be disposed on the main body. The receiver (300) may be disposed on one surface of main body. That is, the receiver (300) may be disposed on a same surface as that of dual camera module. Alternatively, the receiver (300) may be disposed at the other surface of main body, which is different from the one surface of main body.

The receiver (300) may be disposed at a first camera module (1000) side in the dual camera module. The receiver (300) may be disposed at a second side plate (1420) side of the first camera module (1000). In this case, the receiver (300) may be spaced apart from the second side plate (1420). The receiver (300) may function to receive an electronic signal in an optical device (e.g., smart phone) or convert the received electronic signal to a sound signal and output the sound signal.

Hereinafter, configuration of a dual camera module according to an exemplary embodiment of the present invention will be described with reference to the accompanying drawings. The dual camera module according to the exemplary embodiment may have various exemplary embodiments. Hereinafter, the dual camera module according to the exemplary embodiment relates to a dual camera module in which all elements applicable to various exemplary embodiments are integrated.

Figure 2:
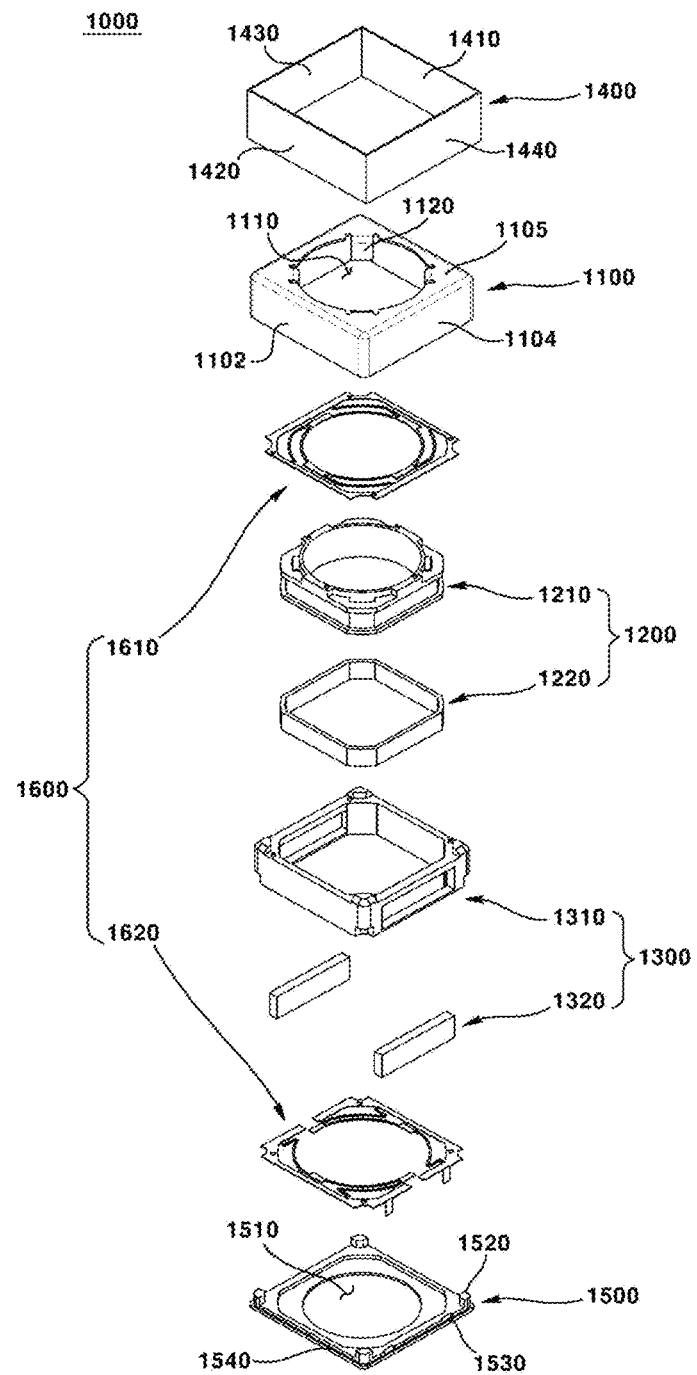
FIG. 2 is an exploded perspective view of a first camera module according to an exemplary embodiment of present invention.
Figure 3:
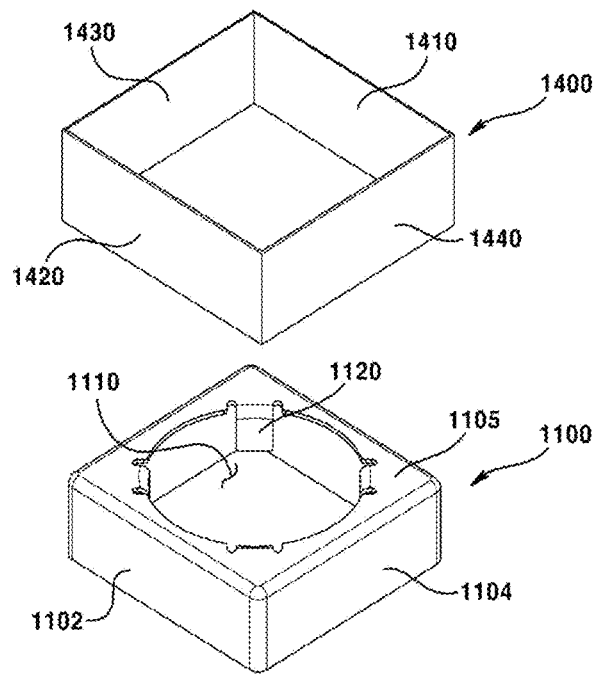
FIG. 3 is an exploded perspective view of a first cover member and a shield member according to an exemplary embodiment of present invention.
Figure 4:
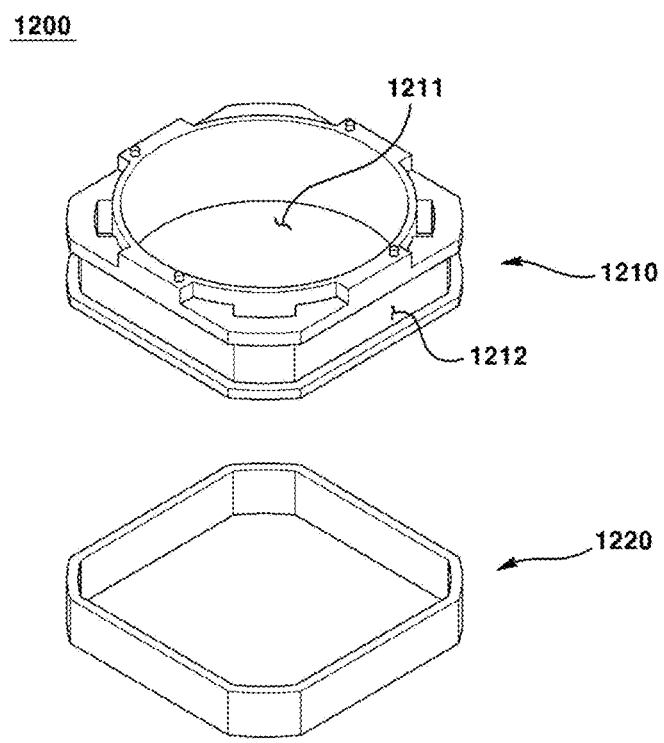
FIG. 4 is an exploded perspective view of a mover at a first camera module according to an exemplary embodiment of present invention.
Figure 5:
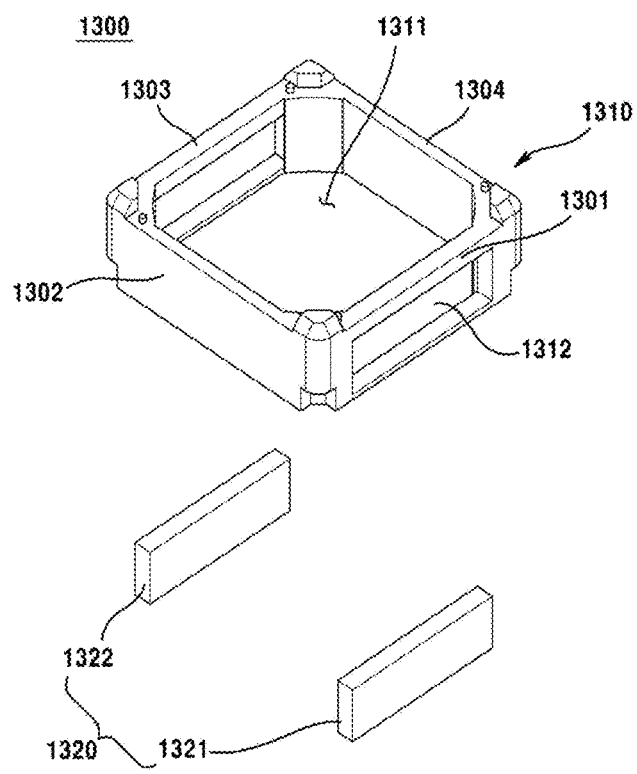
FIG. 5 is an exploded perspective view of a stator at a first camera module according to an exemplary embodiment of present invention.
Figure 6:
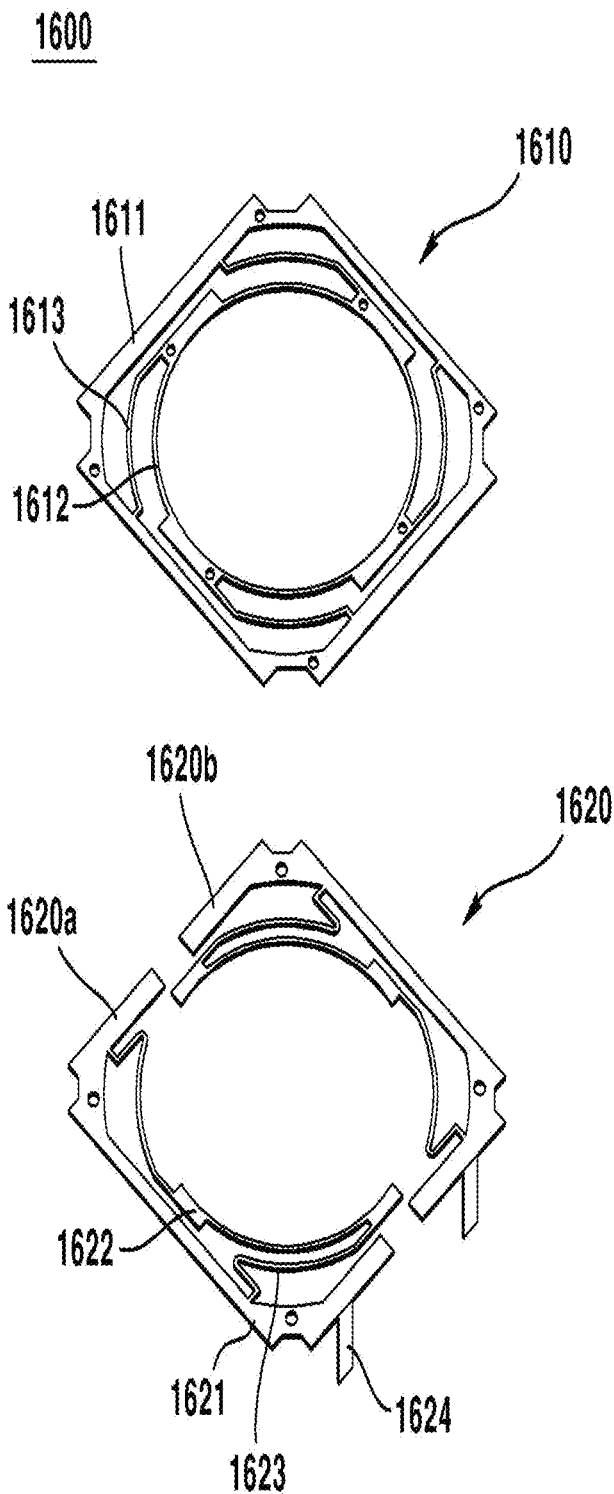
FIG. 6 is an exploded perspective view of a stator at a first AF support member according to an exemplary embodiment of present invention.
Figure 7:
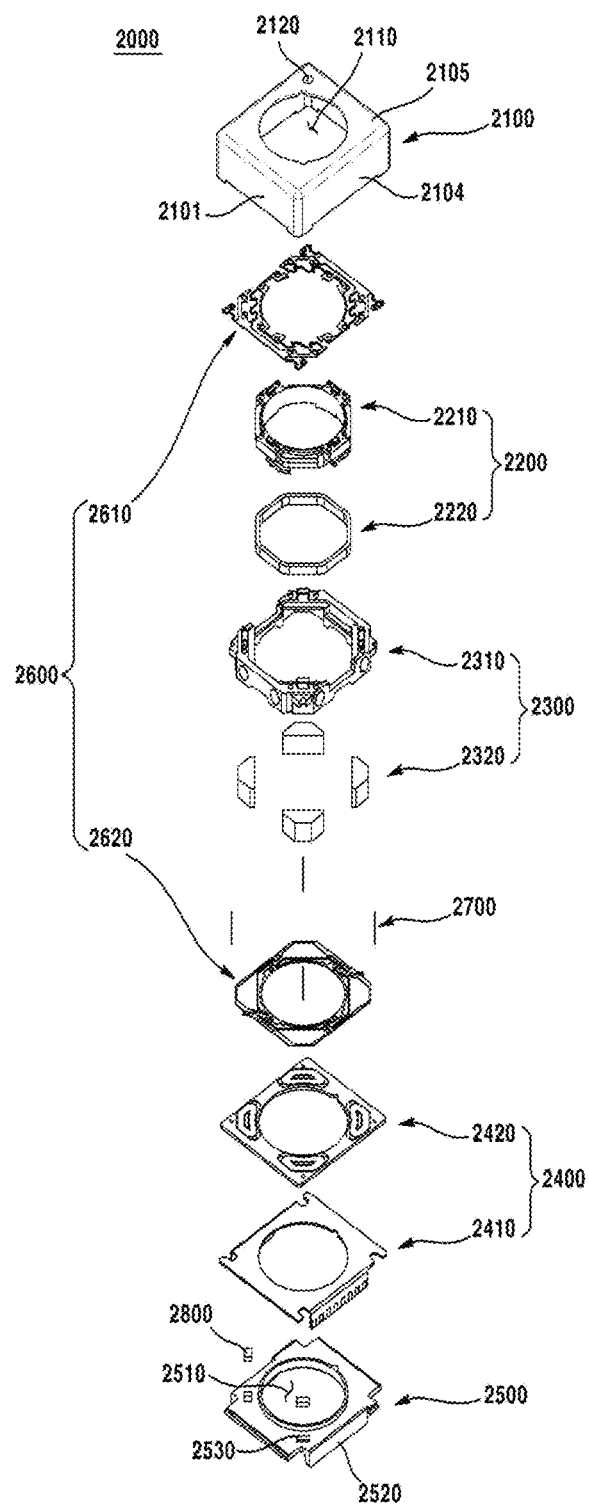
FIG. 7 is an exploded perspective view of a second camera module according to an exemplary embodiment of present invention.
Figure 8:
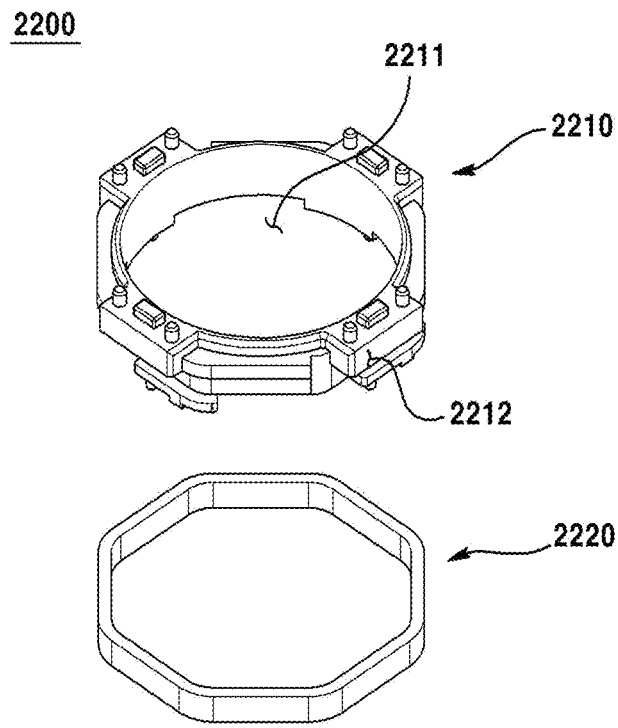
FIG. 8 is an exploded perspective view of an AF mover of second camera module according to an exemplary embodiment of present invention.
Figure 9:
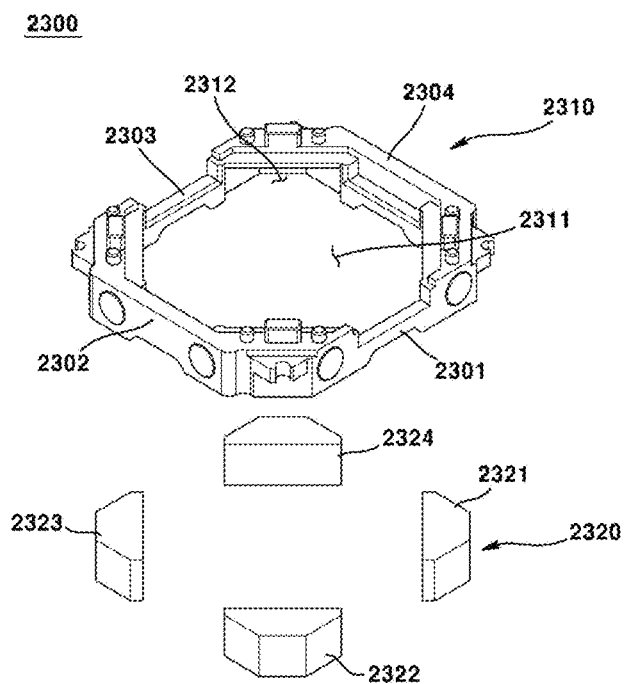
FIG. 9 is an exploded perspective view of an OIS mover of second camera module according to an exemplary embodiment of present invention.
Figure 10:
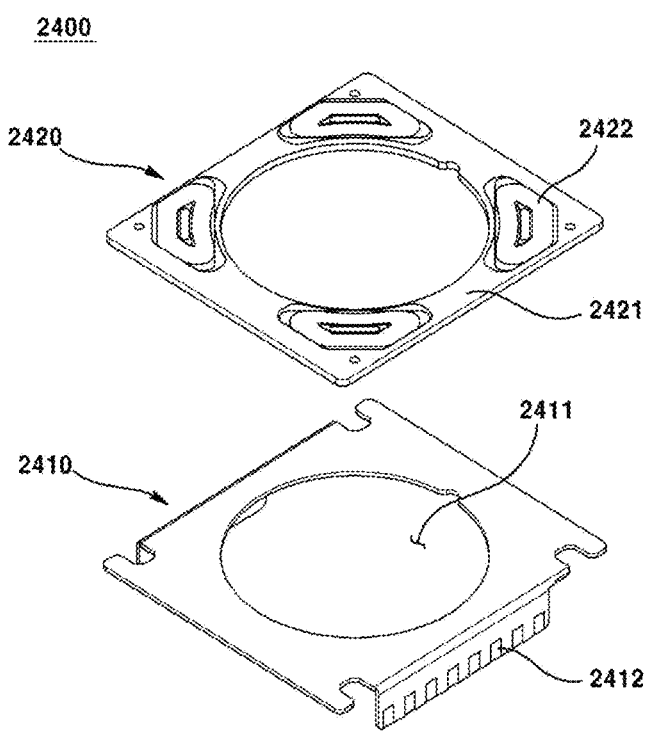
FIG. 10 is an exploded perspective view of a stator of second camera module according to an exemplary embodiment of present invention.
Figure 11:
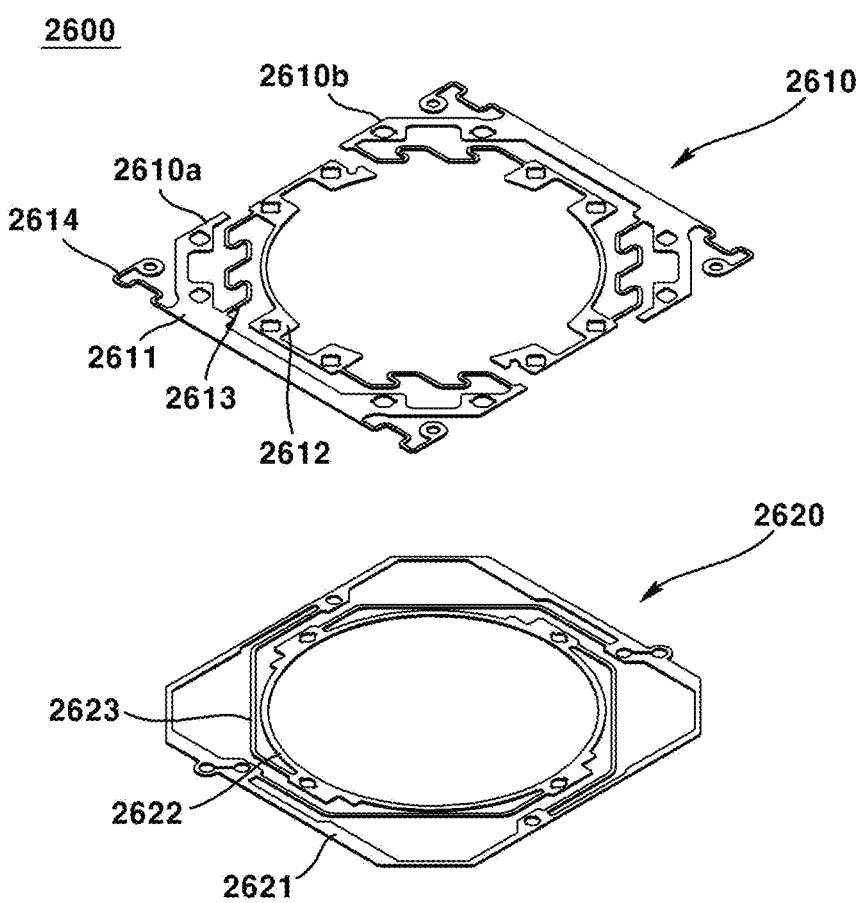
FIG. 11 is an exploded perspective view of a second AF support member of second camera module according to an exemplary embodiment of present invention.

FIG. 1 is a perspective view of a dual camera module according to an exemplary embodiment of present invention (Although FIG. 1 illustrates that the first camera module (1000) is disposed at the right side and the second camera module (2000) is disposed at a left side, the drawings and explanation hereinafter will illustrate and explain that the first camera module (1000) is disposed at the left side and the second camera module (2000) is disposed at the right side), FIG. 2 is an exploded perspective view of a first camera module according to an exemplary embodiment of present invention, FIG. 3 is an exploded perspective view of a first cover member and a shield member according to an exemplary embodiment of present invention, FIG. 4 is an exploded perspective view of a mover at a first camera module according to an exemplary embodiment of present invention, FIG. 5 is an exploded perspective view of a stator at a first camera module according to an exemplary embodiment of present invention, FIG. 6 is an exploded perspective view of a stator at a first AF support member according to an exemplary embodiment of present invention, FIG. 7 is an exploded perspective view of a second camera module according to an exemplary embodiment of present invention, FIG. 8 is an exploded perspective view of an AF mover of second camera module according to an exemplary embodiment of present invention, FIG. 9 is an exploded perspective view of an OIS mover of second camera module according to an exemplary embodiment of present invention, FIG. 10 is an exploded perspective view of a stator of second camera module according to an exemplary embodiment of present invention, and FIG. 11 is an exploded perspective view of a second AF support member of second camera module according to an exemplary embodiment of present invention.

The dual camera module according to an exemplary embodiment of present invention may comprise a first camera module (1000) and a second camera module (2000).

The first camera module (1000) may be an AF driving camera module. At this time, the first camera module (1000) may be called an "AF camera module". Alternatively, the first camera module (1000) may be disposed with an OIS driving camera module.

The first camera module (1000) may comprise a first lens driving device, a first lens module (not shown), a first infrared filter (not shown), a first PCB (1001), a first image sensor (not shown) and a first controller (not shown).

However, any one or more of the first lens driving device, the first lens module, the first infrared filter, the first PCB (1001), the first image sensor and the first controller may be omitted or changed from the configuration of first camera module (1000).

The first lens module may comprise a lens and a lens barrel (not shown). The first lens module may comprise one or more lenses (not shown) and a lens barrel accommodating one or more lenses. However, one element of the first lens module is limited by the lens module, and any holder structure capable of supporting one or more lenses will suffice. The first lens module may move along with a first lens driving device by being coupled to the first lens driving device. The first lens module may be coupled to an inside of the first lens driving device. The first lens module may be screw-coupled to the first lens driving device. The first lens module may be coupled with the first lens driving device by an adhesive (not shown). Meantime, a light having passed the first lens module may be irradiated on a first image sensor.

The first infrared filter may serve to inhibit a light of infrared ray region from entering the first image sensor. The first infrared filter may be interposed between the first lens module and the first image sensor. The first infrared filter may be disposed at a holder member (not shown) that is separately disposed from a first base (1500). However, the first infrared filter may be mounted on an opening (1510) formed at a center of the first base (1500). The first infrared filter may be formed with a film material or a glass material. The first infrared filter may be formed by allowing an infrared cut-off coating material to be coated on a plate-shaped optical filter such as an imaging plane protection cover glass or a cover glass. The first infrared filter may be an infrared cut-off filter or an infrared absorption filter.

The first PCB (1001) may support the first lens driving device. The first PCB (1001) may be mounted with the first image sensor. For example, the first PCB (1001) may be disposed at an inner upper side with the first image sensor and may be disposed at an outer upper side with a first sensor holder (1002). Alternatively, an upper side of the first sensor holder (1002) may be disposed with the first lens driving device. The first sensor holder (1002) may be integrally formed with the first base (1500). Alternatively, the first PCB (1001) may be disposed at an upper outer side with the first lens driving device, and may be disposed at an inner upper side with the first image sensor. Through the said structure, a light having passed the first lens module accommodated at an inside of the first lens driving device may be irradiated on the first image sensor mounted on the first PCB (1001). The first PCB (1001) may supply a power to the first lens driving device. Meantime, the first PCB (1001) may be disposed with a first controller in order to control the first lens driving device.

The first image sensor may be mounted on the first PCB (1001). The first image sensor may be so disposed as to match the first lens module by way of optical axis, through which the first image sensor can obtain a light having passed the first lens module. The first image sensor may output the irradiated light in an image. The first image sensor may be, for example, a CCD (charge coupled device), a MOS (metal oxide semi-conductor), a CPD and a CID. However, the types of first image sensors are not limited thereto.

The first controller may be mounted on the first PCB (1001). The first controller may be disposed at an outside of the first lens driving device. The first controller may be disposed at an inside of the first lens driving device, though. The first controller may control a direction, intensity and an amplitude of a current supplied to each element forming the first lens driving device. The first controller may perform any one or more of an auto focus function and an OIS function of the first camera module (1000) by controlling the first lens driving device. That is, the first controller may move the first lens module to an optical axis direction or to a direction perpendicular to the optical axis or tilt the first lens module by controlling the first lens driving device. Furthermore, the first controller may perform a feedback control of the auto focus function and the OIS function. To be more specific, the first controller may provide a more accurate auto focus function by controlling a current or a power supplied to a first coil (1220) by receiving a position of the first bobbin (1220) detected by a Hall sensor (not shown).

The first camera module (1000) may comprise a first cover member (1100), a mover (1200), a stator (1300), first to fourth shield members (1410, 1420, 1430, 1440)), a third magnet unit (1411), a fourth magnet unit (1421), a first base (1500) and a first AF support member (1600). However, any one or more of the first cover member (1100), the mover (1200), the stator (1300), the first to fourth shield members (1410, 1420, 1430, 1440), the third magnet unit (1411), the fourth magnet unit (1421), the first base (1500) and the first AF support member (1600) may be omitted or changed from the first camera module (1000).

The first cover member (1100) may be integrally formed with the first housing (1310). Alternatively, the first cover member (1100) may be omitted and the first housing (1310) may function as the first cover member (1100).

That is, the first cover member (1100) may be the first housing (1310).

The first cover member (1100) may form an exterior shape of the first lens driving device. The first cover member may take a bottom-opened cubic shape. However, the present invention is not limited thereto. The first cover member (1100) may be a non-magnetic substance. If the first cover member (1100) is formed with a magnetic substance, a magnetic force of the first cover member (1100) may be affected to a second magnet unit (2320) of a second camera module (2000). The first cover member (1100) may be formed with a metal material. To be more specific, the first cover member (1100) may be formed with a metal plate. In this case, the first cover member (1100) can shield an EMI (Electro Magnetic Interference). Because of the said characteristics of the first cover member (1100), the first cover member (1100) may be called an "EMI shield can". The first cover member (1100) may shield the electromagnetic waves generated from an outside of the first lens driving device from entering into the first cover member (1100). Furthermore, the first cover member (1100) may inhibit the electromagnetic waves generated from inside of the first cover member (1100) from being emitted to an outside of the first cover member (1100). However, the material of the first cover member (1100) is not limited thereto.

The first cover member (1100) may comprise first to fourth side plates (1101, 1102, 1103, 1104) and an upper plate (1105). The first cover member (1100) may comprise an upper plate (1105) and the first to fourth side plates (1101, 1102, 1103, 1104) extended from an outside of upper plate (1105) to a lower side. A lower end of the first to fourth side plates (1101, 1102, 1103, 1104) at the first cover member (1100) may be mounted on the first base (1500). A lower end of the first to fourth side plates (1101, 1102, 1103, 1104) at the first cover member (1100) may be coupled to a staircase part (1540) of the first base (1500). The first cover member (1100) may be adhered at an inside surface to a whole part or to a portion of a side of the first base (1500). An inner space formed by the first cover member (1100) and the first base (1500) may be disposed with the mover (1200), the stator (1300) and the first AF support member (1600). Through this structure, the first cover member (1100) can protect inner elements from the outside shocks and inhibit outside foreign objects from entering at the same time. However, the present invention is not limited thereto, and the lower end of the first to fourth side plates (1101, 1102, 1103, 1104) at the first cover member (1100) may be directly coupled to the first PCB disposed at a lower side of first base (1500).

The first side plate (1101) may face a second cover member (2100). The first side plate (1101) may face a fifth side plate (2105) of second cover member (2100). The first side plate (1101) may be disposed in parallel with the fifth side plate (2105) of second cover member (2100). The first side plate (1101) may be perpendicular to the third and fourth side plates (1103, 1104). The first side plate (1101) may be disposed with a first shield member (1410). The first side plate (1101) may be disposed with the first shield member (1410) by being attached thereto. In this case, an outside surface of the first side plate (1101) may contact an inside surface of first shield member (1410), whereby a magnetic force following a magnetic force line extended from the first magnet unit (1320) to the first side plate (1101) may be shielded.

The second side plate (1102) may be disposed opposite to the first side plate (1101). The second side plate (1102) may be disposed in parallel with the first side plate (1101). The second side plate (1102) may be perpendicular to the third and fourth side plates (1103, 1104). The second side plate (1102) may be disposed with a second shield member (1420). The second side plate (1102) may be disposed with the second shield member (1420) by being attached with the second shield member (1420). In this case, an outside surface of the second side plate (1102) may contact an inside surface of second shield member (1420). Thus, a magnetic force following a magnetic force line extended to a second side plate (1102) side from the first magnetic unit (1320) may be shielded.

The third side plate (1103) may be interposed between the first side plate (1101) and the second side plate (1102). The third side plate (1103) may be disposed in parallel with the fourth side plate (1104). The third side plate (1103) may be perpendicular to the first and second side plates (1101, 1102). The third side plate (1103) may be disposed with a third shield member (1430). The third side plate (1103) may be disposed with the third shield member (1430) by being attached with the third shield member (1430). In this case, an outside surface of the third side plate (1103) may contact an inside surface of third shield member (1430). Thus, a magnetic force following a magnetic force line extended to a third side plate (1103) side from the first magnetic unit (1320) may be shielded.

The fourth side plate (1104) may be interposed between the first side plate (1101) and the second side plate (1102). The fourth side plate (1104) may be disposed in parallel with the third side plate (1103). The fourth side plate (1104) may be perpendicular to the first and second side plates (1101, 1102). The fourth side plate (1104) may be disposed with a fourth shield member (1440). The fourth side plate (1104) may be disposed with the fourth shield member (1440) by being attached with the fourth shield member (1440). In this case, an outside surface of the fourth side plate (1104) may contact an inside surface of fourth shield member (1440). Thus, a magnetic force following a magnetic force line extended to a fourth side plate (1104) side from the first magnetic unit (1320) may be shielded.

Both adjacent distal ends among distal ends of first to fourth side plates (1101, 1102, 1103, 1104) may form a closed integral side surface by being mutually adjacent.

The first cover member (1100) may comprise an opening (1110) and an extension (1120). However, the extension part (1120) may be omitted or changed from the first cover member (1100).

The opening (1110) may be formed at an upper plate (1105). The opening (1110) may expose the first lens module. The opening (1110) may be formed with a shape corresponding to that of the first lens module. The opening (1110) may be formed larger in size than a diameter of the first lens module to allow the first lens module to be assembled through the opening (1110). Meantime, a light introduced into through the opening (1110) may pass through the first lens module. At this time, the light having passed the first lens module may be obtained by the first image sensor as an image.

The extension part (1120) may be formed by being bent from an inside surface of the upper plate (1105) to a lower side. The extension part (1120) may be called an "inner yoke". At least one portion of extension part (1120) may be formed on a first bobbin (1210) and inserted into a groove. Through this structure, the first bobbin (1210) may be inhibited from a phenomenon of the first bobbin (1210) being rotated in the screw-coupling process of the first lens module to the first bobbin (1210). In other situations, the extension part (1120) can inhibit the first bobbin (1210) from rotating relative to the first cover member (1100).

The mover (1200) may be coupled with the first lens module. The mover (1200) may accommodate the first lens module to an inside thereof. An inside surface of mover (1200) may be coupled with an outside surface of first lens module. The mover (1200) may move integrally with the first lens module through an electromagnetic interaction with the stator (1300). The mover (1200) may comprise a first bobbin (1210) and a first coil (1220). However, any one or more of the first bobbin (1210) and the first coil (1220) may be omitted or changed.

The first bobbin (1210) may be disposed at an inside of a first housing (1310). The first bobbin (1210) may be accommodated into a through hole (1311) of the first housing (1310). The first bobbin (1210) may be coupled with the first lens module. To be more specific, an inside surface of first bobbin (1210) may be coupled with an outside surface of first lens module. The first bobbin (1210) may be coupled with the first coil (1220). A lower surface of first bobbin (1210) may be coupled with a first lower support member (1620). An upper surface of first bobbin (1210) may be coupled with a first upper support member (1610). The first bobbin (1210) may move to an optical axis direction relative to the first housing (1310).

The first bobbin (1210) may comprise a through hole (1211) and a coil reception part (1212). However, any one or more of the through hole (1211) and the reception part (1212) may be omitted or changed from the first bobbin (1210).

The through hole (1211) may be formed at an inside of the first bobbin (1210). The through hole (1211) may be formed with upper/lower sides-opened shape. The through hole (1211) may be coupled with the first lens module. The through hole (1211) may be formed at an inside surface with a screw thread of a shape corresponding to that formed at an outside of the first lens module. That is, the through hole (1211) may be screw-coupled with the first lens module. An adhesive may be interposed between the first lens module and the first bobbin (1210). At this time, the adhesive may be an epoxy hardened by heat, UV or laser. That is, the first lens module and the first bobbin (1210) may be coupled by a UV-hardening epoxy and/or heat-hardening epoxy.

The coil reception part (1212) may accommodate at least one portion of the first coil (1220). The coil reception part (1212) may be integrally formed with an outside surface of first bobbin (1210). Furthermore, the coil reception part (1212) may be continuously formed along an outside surface of first bobbin (1210) or may be spaced apart from the outside surface of first bobbin (1210) at a predetermined gap. For example, the coil reception part (1212) may be formed by allowing a portion of the outside surface of the first bobbin (1210) to be recessed in a shape corresponding to that of the first coil (1220). At this time, the first coil (1220) may be directly wound on a first driving part coupling part (1212). As a modification, the coil reception part (1212) may be formed by allowing an upper side or a lower side to be opened. At this time, the first coil (1220) may be inserted into and coupled with the coil reception part (1212) through the opened portion while being in a pre-wound state.

The first coil (1220) may be disposed at the first bobbin (1210). The first coil (1220) may be disposed at an outside surface of the first bobbin (1210). The first coil (1220) may be directly wound on an outside surface of first bobbin (1210). The first coil (1220) may mutually and electromagnetically interact with the first magnet unit (1320). The first coil (1220) may face the first magnet unit (1320). In this case, when a current is supplied to the first coil (1220) to allow forming a magnetic field about the first coil (1220), the first coil (1220) may move relative to the first magnet unit (1320) in response to the electromagnetic interaction between the first coil (1220) and the first magnet unit (1320). The first coil (1220) may move for AF driving. In this case, the first coil (1220) may be called an "AF coil".

The first coil (1220) may comprise a pair of lead cables (not shown) for power supply. The pair of lead cables at the first coil (1220) may be electrically connected to the first lower support member (1620). Each of the lead cables of the first coil (1220) may be respectively connected to first and second support units (1620a, 1620b). In this case, an electric power may be supplied to the first coil (1220) through the first lower support member (1620) electrically connected to the first PCB (1001) through a terminal part (1624).

The stator (1300) may accommodate the mover (1200) at an inside thereof. The stator (1300), as a fixed member, may move the mover (1200) through an electromagnetic interaction. The stator (1300) may comprise a first housing (1310) and a first magnet unit (1320). However, any one or more of the first housing (1310) and the first magnet unit (1320) may be omitted or changed.

The first housing (1310) may be disposed at an outside of the first bobbin (1210). The housing (1310) may be spaced apart from the first bobbin (1210). At least one portion of the first housing (1310) may be formed with a shape corresponding to that of an inside surface of the first cover member (1100). Particularly, an outside surface of the first housing (1310) may be formed with a shape corresponding to that of an inside surface of lateral plate (1102) of the first cover member (1100). The first housing (1310) may take a cubic shape comprising four side surfaces, for example. However, the shape of first housing (1310) may be formed with any shape as long as the first housing (1310) can be disposed inside the first cover member (1100). The first housing (1310) may be formed with an injection in consideration of productivity. The first housing (1310) may be fixed on the first base (1500). The first housing (1310) may be omitted and the first magnet unit (1320) may be fixed to the first cover member (1100), as a modification. An upper surface of first housing (1310) may be coupled with a first upper support member (1610). The first housing (1310) may be coupled at a lower side with a first lower support member (1620).

The first housing (1310) may comprise first to fourth side surfaces (1301, 1302, 1303, 1304). The first housing (1310) may comprise continuously disposed first to fourth side surfaces (1301, 1302, 1303, 1304). The housing (1310) may comprise a first side surface (1301) disposed with a first magnet (1321), a second side surface (1302) disposed with a third magnet unit (1411), a third side surface (1303) disposed with a second magnet (1322). The first housing (1310) may comprise a fourth side surface (1304) disposed with a fourth magnet unit (1421). The second side surface (1302) may face an eighth side surface (2304).

The first housing (1310) may comprise a through hole (1311), a magnet reception part (1312), a third magnet unit (not shown) and a fourth magnet unit reception part (not shown). However, any one or more of the through hole (1311), the magnet reception part (1312), the third magnet unit and the fourth magnet unit reception part may be omitted or changed.

The through hole (1311) may be formed at an inside of the first housing (1311). The through hole (1311) may be opened at an upper side and a lower side. The housing (1310) may be accommodated with the first bobbin (1210). The through hole (1310) may be movably disposed with the first bobbin (1210). The through hole (1310) may be formed with a shape corresponding to that of the first bobbin (1210).

The magnet reception part (1312) may be formed at a side surface of the first housing (1310). The magnet reception part (1312) may be formed with a hole through which the first housing (1310) can pass. Alternatively, the magnet reception part (1312) may be formed with a hole formed by allowing a portion of the first housing (1310) to be recessed. The magnet reception part (1312) may accommodate at least a portion of the first magnet unit (1320). An adhesive (not shown) may be interposed between the first magnet unit (1320) and the magnet reception part (1312). That is, the first magnet unit (1320) and the magnet reception part (1312) may be coupled by an adhesive. The magnet reception part (1312) may be disposed at an inside surface of first housing (1310). The magnet reception part (1312) may be formed by allowing a portion of an inside of the first housing (1310) to be outwardly recessed. In this case, the electromagnetic interaction with the first coil (1220) disposed at an inside of the first magnet unit (1320) may be advantageously implemented.

A third magnet unit reception part may be formed at the second side surface (1302) of first housing (1310). The third magnet unit reception part may be formed at an outside of the first housing (1310). Alternatively, the third magnet unit reception part may be formed with a hole to allow passing through the first housing (1310). The third magnet unit reception part may accommodate a third magnet unit (1411). The third magnet unit reception part may accommodate at least one portion of the third magnet unit (1411). The third magnet unit reception part may be formed with a shape corresponding to that of the third magnet unit (1411). The fourth magnet unit reception part may be formed with a hole to allow passing through the first housing (1310).

A fourth magnet unit reception unit may be formed at the fourth side surface (1304) of first housing (1310). The fourth magnet unit reception part may be formed at an outside of the first housing (1310). The fourth magnet unit reception part may be formed at an outside of the first housing (1310) by being inwardly recessed. Alternatively, the fourth magnet unit reception part may accommodate a fourth magnet unit (1421). The fourth magnet unit reception part may accommodate at least one portion of the fourth magnet unit (1421). The fourth magnet unit reception part may be formed with a shape corresponding to that of the fourth magnet unit (1421). The fourth magnet unit reception part may be symmetrical with the third magnet reception part based on an optical axis of the first camera module (1000).

The first magnet unit (1320) may be disposed at the first housing (1310). The first magnet unit (1320) may be accommodated into the magnet reception part (1312) of first housing (1310). The first magnet unit (1320) may electromagnetically interact with the first coil (1220). The first magnet unit (1320) may face the first coil (1220). The first magnet unit (1320) may move the first bobbin (1210) fixed at the first coil (1220). The first magnet unit (1320) may move the first coil (1220) for AF driving. In this case, the first magnet unit (1320) may be called an "AF magnet".

The first magnet unit (1320) may comprise first and second magnets (1321, 1322). The first magnet unit may comprise the first and second magnets (1321, 1322) each spaced apart. The first magnet unit (1320) may comprise the first and second magnets (1321, 1322) both disposed opposite to each other on the side surface of the first housing (1310). The first magnet unit (1320) may comprise a first magnet (1321) disposed at a first side surface (1322) and a second magnet (1322) disposed at the third side surface (1303).

The first and second magnets (1321, 1322) may be symmetrical based on an optical axis of the first camera module (1000). The first and second magnets (1321, 1322) may have a symmetrical size and shape about an optical axis of first camera module (1000). The first and second magnets (1321, 1322) may be disposed, each at a corresponding position based on an optical axis of the first camera module (1000). The first and second magnets (1321, 1322) may be disposed mutually in parallel. Each of the first and second magnets (1321, 1322) may be so disposed as to face an inside with the same polarity. The N pole of the first and second magnets (1321, 1322) may be so disposed to face an inside. The first and second magnets (1321, 1322) may be formed with a flat plate shape. The first and second magnets (1321, 1322) may be called a "flat plate magnet".

The third magnet unit (1411) may be disposed at a side surface of first housing (1310) facing a second housing (2310). The third magnet unit (1411) may be disposed at a second side surface (1302) of first housing (1310). The third magnet unit (1411) may be interposed between the first magnet (1321) and the second magnet (1322). The third magnet unit (1411) may be smaller than the first magnet (1321). The third magnet unit (1411) may have a width smaller than the first magnet (1321). The third magnet unit (1411) may have a thickness thinner than the first magnet (1321). The third magnet unit (1411) may have a height lower than the first magnet (1321). Alternatively, the third magnet unit (1411) may have a height same as the first magnet (1321). The third magnet unit (1411) may be smaller than the second magnet (1322). The third magnet unit (1411) may be disposed on a virtual line connecting an optical axis of first camera module (1000) and an optical axis of second camera module (2000).

The third magnet unit (1411) may be so disposed as to face an inside with the same polarity as that of the first and second magnets (1321, 1322). The S pole of the third magnet unit (1411) may be so disposed to face an inside. Alternatively, the third magnet unit (1411) may be so disposed to face an inside at the S pole.

When viewed from an upper surface, a length (see 1-3 of FIG. 13) of the third magnet (1411) to a direction parallel with the second side surface (1302) may be shorter than a discrete distance (see 1-4 of FIG. 13) between a third magnet (2321) and a sixth magnet (2324). Under this condition, the third magnet unit (1411) can minimize an influence affected by the first magnet unit (1320) to the second magnet unit (2320). When viewed from an upper surface, a length (1-3) of the third magnet unit (1411) to a direction parallel with the second side surface (1302) may be 1 mm. A length (1-3) of the third magnet unit (1411) to a direction parallel with the second side surface (1302) may be 0.8 mm-1.2 mm. A length (1-3) of the third magnet unit (1411) to a direction parallel with the second side surface (1302) may be 0.5 mm-1.5 mm.

When viewed from an upper surface, a length (1-3) of the third magnet unit (1411) to a direction parallel with the second side surface (1302) may be less than 50% of a lengthwise length (see 1-5 of FIG. 13) of the first magnet (1321) to a direction parallel with the first side surface (1301). Under this condition, the third magnet unit (1411) can minimize an influence affected by the first magnet unit (1320) to the second magnet unit (2320). Meantime, a length (1-3) of the third magnet unit (1411) to a direction parallel with the second side surface (1302) may be more than 0.5 mm.

In the present exemplary embodiment, arrangement of the third magnet unit (1411) on the AF camera module formed with a flat plate magnet can minimize a magnetic force affecting, by a magnet of AF camera module, on a corner magnet of the OIS camera module. If, when the third magnet unit (1411) is removed under a condition where a current is not corrected in the present exemplary embodiment, an optical axis of the second camera module (2000) may move more than 5 μm.

A fourth magnet unit (1421) may be disposed at the first housing (1310). The fourth magnet unit (1421) may be disposed at a fourth side surface (1304) of first housing (1310). The fourth magnet unit (1421) may be symmetrically disposed with the third magnet unit (1411) based on a center of an optical axis of the first camera module (1000). The fourth magnet unit (1421) may be disposed at a position corresponding to that of the third magnet unit (1411) based on a center of optical axis of the first camera module (1000). The fourth magnet unit (1421) may be disposed with a size and a shape corresponding to those of the third magnet unit (1411) based on a center of optical axis of the first camera module (1000). The fourth magnet unit (1421) may be interposed between the first and second magnets (1321, 1322). The fourth magnet unit (1421) may be smaller than the first magnet (1321). The fourth magnet unit (1421) may have a width smaller than the first magnet (1321). The fourth magnet unit (1421) may have a thickness thinner than the first magnet (1321). The fourth magnet unit (1421) may have a height lower than the first magnet (1321). Alternatively, the fourth magnet unit (1421) may have a same height as the first magnet (1321). The fourth magnet unit (1421) may be smaller than the second magnet (1322).

The fourth magnet unit (1421) may be disposed on a virtual line connecting an optical axis of first camera module (1000) and an optical axis of second camera module (2000). The fourth magnet unit (1421) may be so disposed as to face an inside with the same polarity as that of the first and second magnets (1321, 1322). The fourth magnet unit (1421) may be so disposed as to face an inside with the same polarity as that of the third magnet unit (1411). The N pole of the fourth magnet unit (1421) may be so disposed to face an inside. Alternatively, the fourth magnet unit (1421) may be so disposed to face an inside at the S pole.

In the present exemplary embodiment, arrangement of the fourth magnet unit (1421) corresponding to the third magnet unit (1411) can offset an influence affected by an AF driving of the first camera module (1000) to the third magnet unit (1411). Alternatively, the fourth magnet unit (1421) may affect a symmetrical influence on an influence affected by the third magnetic unit (1411) to the AF driving of the first camera module (1000).

The first to fourth shield members (1410,1420,1430,1440) may be formed with material that shields the magnetic force. The first to fourth shield members (1410,1420,1430,1440) may be a metal or a magnetic substance. The first to fourth shield members (1410,1420,1430,1440) may be respectively disposed at the first to fourth side plates (1101,1102,1103,1104) of first cover member (1100). The first to fourth shield members (1410,1420,1430,1440) may take a flat plate shape. In this case, an inside surface of the flat plate may be disposed by contacting an outside surface of first to fourth side plates (1101,1102,1103,1104) of first cover member (1100). The first to fourth shield members (1410,1420,1430,1440) may be integrally formed by being mutually connected. Distal ends of mutually adjacent shield members are connected to form an integral shield member. In this case, the first to fourth shield members (1410,1420,1430,1440) may cover all the outside surfaces of the first to fourth side plates (1101,1102,1103,1104).

The first shield member (1410) may be disposed at the first side plate (1101). The first shield member (1410) may be so disposed as to face a fifth side plate (2101) of second cover member (2100). The second shield member (1410) may be dispose to be parallel with the fifth side plate (2101). The first shield member (1410) may be disposed to be parallel with the second shield member (1420). The first shield member (1410) may be so disposed as to be perpendicular to the third and fourth shield members (1430,1440). The first shield member (1410) may take a flat plate shape. In this case, an inside surface of first shield member (1410) may be so disposed as to contact an outside surface of first side plate (1101). Furthermore, a lengthwise length of first shield member (1410) may be longer than a lengthwise length of first side plate (1101). Moreover, a widthwise length of first shield member (1410) may be longer than a widthwise length of first side plate (1101). As a result, the first shield member (1410) can shield the magnetic force emitted to an outside through the first side plate (1101) by covering all the first side plate (1101).

A magnetic force following a magnetic force line extended to a first side plate (1101) side from the first magnet unit (1320) may be so formed as to be proximate to the second magnet unit (2320) disposed at the second housing (2310). As a result, a magnetic field of second magnet unit (2320) may be interfered by the magnetic force of first magnet unit (1320). However, the magnetic force affected by the first magnet unit (1320) onto the second magnet unit (2320) may be shielded by the first shield member (1410). That is, the magnetic force of first magnet unit (1320) can inhibit interference of magnetic field of the second magnet unit (2320). As a result, the lean of second housing (2310) toward to a first lens driving device side or to an opposite side can be inhibited. Furthermore, the second housing (2310) can be free from the magnetic force of first magnet unit (1320) and may be driven as per the preset design condition.

The second shield member (1420) may be disposed at the second side plate (1102). The second shield member (1420) may be disposed opposite to the first shield member (1410). The second shield member (1420) may be disposed in parallel with the first shield member (1410). The second shield member (1420) may be so disposed as to be perpendicular to the third and fourth shield members (1430,1440). The second shield member (1420) may take a flat plate shape. In this case, an inside surface of second shield member (1420) may be so disposed as to contact an outside surface of second side plate (1102). Furthermore, a lengthwise length of second shield member (1420) may be longer than a lengthwise length of second side plate (1102). Moreover, a widthwise length of second shield member (1420) may be longer than a widthwise length of second side plate (1102). As a result, the second shield member (1420) can cover all the second side plate (1102) to shield the magnetic force emitted to an outside through the second side plate (1102).

The magnetic force following a magnetic force line extended to a second side plate (1102) side from the first magnet unit (1320) may be so disposed as to be proximate to a receiver (3000) in the elements of abovementioned optical device. Thus, the receiver (3000) may be affected by the magnetic force of the first magnet unit (1320). However, the magnetic force affected to the receiver (3000) by the first magnet unit (1320) may be shielded by the second shield member (1420). That is, the generation of EMI (Electro Magnetic Interference) on the receiver can be inhibited by the magnetic force of first magnet unit (1320). As a result, the receiver (3000) may receive an electronic signal as per the preset design condition without any electronic interference noise, or may output the received electronic signal to an audio signal by converting the received electronic signal to an audio signal. Furthermore, the first camera module (1000) may be driven in response to the preset driving condition without being interfered by the electronic signal received from the receiver (3000).

The third shield member (1430) may be disposed at the third side plate (1103). The third shield member (1430) may be disposed opposite to the fourth shield member (1440). The third shield member (1430) may be disposed in parallel with the fourth shield member (1440). The third shield member (1430) may be so disposed as to be perpendicular to the first and second shield members (1410, 1420). The third shield member (1430) may take a flat plate shape. In this case, an inside surface of third shield member (1430) may be so disposed as to contact an outside surface of third side plate (1103). Furthermore, a lengthwise length of third shield member (1430) may be longer than a lengthwise length of third side plate (1103). Moreover, a widthwise length of third shield member (1430) may be longer than a widthwise length of third side plate (1103). As a result, the third shield member (1430) can cover all the third side plate (1103) to shield the magnetic force emitted to an outside through the third side plate (1103).

The fourth shield member (1440) may be disposed at the fourth side plate (1104). The fourth shield member (1440) may be disposed opposite to the third shield member (1430). The fourth shield member (1440) may be disposed in parallel with the third shield member (1430). The fourth shield member (1440) may be so disposed as to be perpendicular to the first and second shield members (1410, 1420). The fourth shield member (1440) may take a flat plate shape.

In this case, an inside surface of fourth shield member (1440) may be so disposed as to contact an outside surface of fourth side plate (1104). Furthermore, a lengthwise length of fourth shield member (1440) may be longer than a lengthwise length of fourth side plate (1104). Moreover, a widthwise length of fourth shield member (1440) may be longer than a widthwise length of fourth side plate (1104). As a result, the fourth shield member (1440) can cover all the fourth side plate (1104) to shield the magnetic force emitted to an outside through the fourth side plate (1104).

The third and fourth shield members (1430, 1440) may shield the magnetic force following the magnetic force line extended to third and fourth side plate (1103, 1104) sides from the first magnet unit (1320). When the first camera module (1000) as in the present exemplary embodiment comprises all the first to fourth shield members (1410,1420, 1430,1440), and is formed with integral shield members by allowing adjacent distal ends of first to fourth shield members (1410,1420,1430,1440) to be connected, the magnetic force can be interrupted that is emitted from the first to fourth side plates (1410,1420,1430,1440) by covering all the first to fourth side plates (1410,1420,1430,1440). As a result, the magnetic force affecting on the second camera module (2000) and the receiver (3000) can be shielded, and the magnetic force affected on other peripheral devices (not shown) that may be additionally disposed on the optical device of the present exemplary embodiments can be also shielded.

The first base (1500) may be disposed at a lower side of first housing (1310). The first base (1500) may be disposed at an upper surface of first PCB (1001). The first base (1500) may be coupled by a first infrared filter.

The first base (1500) may comprise an opening (1510), a support part (1520), a terminal reception groove (1530) and a staircase part (1540). However, any one or more of the opening (1510), the support part (1520), the terminal reception groove (1530) and the staircase part (1540) may be omitted or changed from the first base (1500).

The opening (1510) may be formed at a center of first base (1500). The opening (1510) may be so formed as to vertically pass through the first base (1500). The opening (1510) may be overlapped with the first lens module to an optical axis direction. The opening (1510) may pass through a light having passed the first lens module.

The support part (1520) may be protrusively and upwardly formed from an upper surface of first base (1500). The support part (1520) may be respectively formed on four corners. The support part (1520) may be form-fitted to the first housing (1310). Through this form-fitting, the support part (1520) may fix the first housing (1310) to an inside.

The terminal reception groove (1530) may be formed on a side surface of first base (1500). The terminal reception groove (1530) may be formed by allowing a portion of lateral outside surface of first base (1500) to be inwardly recessed. The terminal reception groove (1530) may accommodate at least one portion of terminal part (1624) of first lower support member (1620). The terminal reception groove (1530) may be formed with a width corresponding to that of the terminal part (1624).

The staircase part (1540) may be formed at an external lower end of first base (1500). The staircase part (1540) may be formed by being protruded from an outside surface of first base (1500) to an outside. The staircase part (1540) may support a lower end of side plate (1102) of first cover member (1102).

The first AF support member (1600) may be coupled to the first bobbin (1210) and the first housing (1310). The first AF support member (1600) may elastically support the first bobbin (1210). The first AF support member (1600) may movably support the first bobbin (1210) relative to the first housing (1310). At least one portion of the first AF support member (1600) may possess elasticity. The first AF support member (1600) may comprise a first upper support member (1610) and a first lower support member (1620). However, any one or more of the first upper support member (1610) and the first lower support member (1620) may be omitted or changed from the first AF support member (1600).

The first upper support member (1610) may be coupled to an upper surface of first bobbin and to an upper surface of first housing (1310). The first upper support member (1610) may be integrally formed.

The first upper support member (1610) may comprise an external part (1611), an internal part (1612) and a connection part (1613). However, any one or more of the external part (1611), the internal part (1612) and the connection part (1613) may be omitted or changed from the first upper support member (1610).

The external part (1611) may be coupled to the first housing (1310). The external part (1611) may be coupled to an upper surface of first housing (1310).

The internal part (1612) may be coupled to the first bobbin (1210). The internal part (1612) may be coupled to an upper surface of first bobbin (1210).

The connection part (1613) may connect the external part (1611) and the internal part (1612). The connection part (1613) may elastically connect the external part (1611) and the internal part (1612). The connection part (1613) may possess elasticity.

The first lower support member (1620) may be coupled to a lower surface of first bobbin (1210) and to a lower surface of first housing (1310). The first upper support member (1610) may be electrically connected to the first coil (1220). The first lower support member (1620) may comprise first and second support units (1620a, 1620b). The first and second support units (1620a, 1620b) may respectively be coupled to a pair of lead cables of first coil (1220).

The first lower support member (1620) may comprise an external part (1621), an internal part (1622), a connection part (1623) and a terminal part (1624). However, any one or more of the external part (1621), the internal part (1622), the connection part (1623) and the terminal part (1624) may be omitted or changed from the first lower support member (1620).

The external part (1621) may be coupled to the first housing (1310). The external part (1621) may be coupled to a lower surface of first housing (1310).

The internal part (1622) may be coupled to the first bobbin (1210). The internal part (1622) may be coupled to a lower surface of first bobbin (1210).

The connection part (1623) may connect the external part (1621) and the internal part (1622). The connection part (1623) may elastically connect the external part (1621) and the internal part (1622). The connection part (1623) may possess elasticity.

The terminal part (1624) may be extended from the external part (1621). The terminal part (1624) may be formed by being bent from the external part (1621). The terminal part (1624) may be extended by being downwardly bent from the external part (1621). Alternatively, as a modification, the terminal part (1624) may be disposed as a separate member from the external part (1621). The separately disposed terminal part (1624) and the external part (1621) may be coupled by a conductive member. The terminal part (1624) may be coupled to the first PCB (1001).

The terminal part (1624) may be coupled to the first PCB (1001) by soldering. The terminal part (1624) may be accommodated into the terminal reception groove (1530) of first base (1500).

The second camera module (2000) may be an OIS driving camera module. At this time, the second camera module may be called an "OIS camera module". Meantime, the second camera module (2000) may also perform an AF driving. Alternatively, the second camera module (2000) may be disposed as an AF driving camera module.

The second camera module (2000) may comprise a second lens driving device, a second lens module (not shown), a second infrared filter (not shown), a second PCB (2001), a second image sensor (not shown) and a second controller (not shown). However, any one or more of the second lens driving device, the second lens module, the second infrared filter, the second PCB (2001), the second image sensor and the second controller may be omitted or changed from the second camera module (2000).

The second lens module may comprise a lens and a lens barrel. The second lens module may comprise one or more lenses (not shown) and a lens barrel accommodating one or more lenses. However, one element of second lens module is not limited to the lens barrel, and any holder structure capable of supporting one or more lenses may suffice.

The second lens module may move along with a second lens driving device by being coupled to the second lens driving device. The second lens module may be coupled to an inside of the second lens driving device. The second lens module may be screw-coupled to the second lens driving device. The second lens module may be coupled with the second lens driving device by an adhesive (not shown). Meantime, a light having passed the second lens module may be irradiated on a second image sensor.

The second infrared filter may serve to inhibit a light of infrared ray region from entering the second image sensor. The second infrared filter may be interposed between the second lens module and the second image sensor. The second infrared filter may be disposed at a holder member (not shown) that is separately disposed from a second base (2500). However, the second infrared filter may be also mounted on an opening (2510) formed at a center of the second base (2500). The second infrared filter may be formed with a film material or a glass material. The second infrared filter may be formed by allowing an infrared cut-off coating material to be coated on a plate-shaped optical filter such as an imaging plane protection cover glass or a cover glass. The second infrared filter may be an infrared cut-off filter or an infrared absorption filter.

The second PCB (2001) may support the second lens driving device. The second PCB (2001) may be mounted with the second image sensor. For example, the second PCB (2001) may be disposed at an inner upper side with the second image sensor and may be disposed at an outer upper side with a second sensor holder (2002). An upper side of the second sensor holder (2002) may be disposed with the second lens driving device. The second sensor holder (2002) may be integrally formed with the second base (2500). Alternatively, the second PCB (2001) may be disposed at an upper outer side with the second lens driving device, and may be disposed at an inner upper side with the second image sensor. Through the said structure, a light having passed the second lens module accommodated at an inside of the second lens driving device may be irradiated on the second image sensor mounted on the second PCB (2001). The second PCB (2001) may supply a power to the second lens driving device. Meantime, the second PCB (2001) may be disposed with a second controller in order to control the second lens driving device. The second PCB (2001) may be integrally formed with the first PCB (1001).

The second image sensor may be mounted on the second PCB (2001). The second image sensor may be so disposed as to match the second lens module by way of optical axis, through which the second image sensor can obtain a light having passed the second lens module. The second image sensor may output the irradiated light in an image. The second image sensor may be, for example, a CCD (charge coupled device), a MOS (metal oxide semi-conductor), a CPD and a CID. However, the types of second image sensors are not limited thereto.

The second controller may be mounted on the second PCB (2001). The second controller may be disposed at an outside of the second lens driving device. The second controller may be disposed at an inside of the second lens driving device, though. The second controller may control a direction, intensity and an amplitude of a current supplied to each element forming the second lens driving device. The second controller may perform any one or more of an auto focus function and an OIS function of the second camera module (2000) by controlling the second lens driving device. That is, the second controller may move the second lens module to an optical axis direction or to a direction perpendicular to the optical axis or tilt the second lens module by controlling the second lens driving device. Furthermore, the second controller may perform a feedback control of the auto focus function and the OIS function. To be more specific, the second controller may provide a more accurate auto focus function and/or OIS function by controlling a current or a power supplied to a second coil (2220) and/or third coil (2422) by receiving a position of the second bobbin (2220) and/or second housing (2310) detected by a Hall sensor (2800) and additional sensors (not shown).

The second camera module (2000) may comprise a second cover member (2100), an AF mover (2200), an OIS mover (2300), a stator (2400), a second base (2500), a second AF support member (2600), an OIS support member (2700), and a Hall sensor (2800). However, any one or more of the second cover member (2100), the AF mover (2200), the OIS mover (2300), the stator (2400), the second base (2500), the second AF support member (2600), the OIS support member (2700), and the Hall sensor (2800) may be omitted or changed from the second camera module (2000).

The second cover member (2100) may accommodate the second housing (2310). The second cover member (2100) may be spaced apart from the first cover member (1100). At this time, a discrete distance between the second cover member (2100) and the first cover member (1100) may be less than 4 mm. Alternatively, a discrete distance between the second cover member (2100) and the first cover member (1100) may be within 3 mm. Alternatively, a discrete distance between the second cover member (2100) and the first cover member (1100) may be less than 2 mm. A discrete distance between the second cover member (2100) and the first cover member (1100) may be less than 1 mm.

The second cover member (2100) may form an exterior shape of the second lens driving device. The second cover member (2100) may take a bottom-opened cubic shape. However, the present invention is not limited thereto. The second cover member (2100) may be a non-magnetic substance. If the second cover member (2100) is formed with a magnetic substance, a magnetic force of the second cover member (2100) may be affected onto a second magnet unit (2320). The second cover member (2100) may be formed with a metal material. To be more specific, the second cover member (2100) may be formed with a metal plate. In this case, the second cover member (2100) can shield an EMI (Electro Magnetic Interference). Because of the said characteristics of the second cover member (2100), the second cover member (2100) may be called an "EMI shield can". The second cover member (2100) may shield the electromagnetic waves generated from an outside of the second lens driving device from entering into the second cover member (2100). Furthermore, the second cover member (2100) may inhibit the electromagnetic waves generated from inside of the second cover member (2100) from being emitted to an outside of the second cover member (2100). However, the material of the second cover member (2100) is not limited thereto.

The second cover member (2100) may comprise fifth to eighth side plates (2101, 2102, 2103, 2104) and an upper plate (2105). The second cover member (2100) may comprise an upper plate (21059) and the fifth to eighth side plates (2101, 2102, 2103, 2104) extended from an outside of upper plate (21059) to a lower side. A lower end of the fifth to eighth side plates (2101, 2102, 2103, 2104) at the second cover member (2100) may be mounted on the second base (2500). The second cover member (2100) may be mounted on the second base (2500) by allowing a partial lateral portion or a whole portion of the second base (2500) to be closely contacted to an inside surface. An inner space formed by the second cover member (2100) and the second base (2500) may be disposed with the AF mover (2200), the OIS mover (2300), the stator (2400), the second AF support member (2600) and the OIS support member (2700). Through this structure, the second cover member (2100) may protect inner elements from outside shocks and to inhibit foreign objects from coming. However, the present invention is not limited thereto, and a lower end of the fifth to eighth side plates (2101, 2102, 2103, 2104) at the second cover member (2100) may be directly coupled to the second PCB disposed at a lower side of the second base (2500).

The fifth side plate (2101) may face the first cover member (1100). The fifth side plate (2101) may face a first side plate (1101) of first cover member (1100). The fifth side plate (2101) may be disposed in parallel with the sixth side plate (2102). The fifth side plate (2101) may be perpendicular to the seventh and eighth side plates (2103, 2104). The sixth side plate (2102) may be disposed opposite to the fifth side plate (2101). The seventh and eighth side plates (2103, 2104) may be interposed between the fifth side plate (2101) and the sixth side plate (2102). The seventh and eighth side plates (2103, 2104) may face each other and may be disposed in parallel. Both adjacent distal ends in the fifth to eighth side plates (2101, 2102, 2103, 2104) may be mutually contacted to form a closed integral side surfaces.

The fifth side plate (2101) may be spaced apart from the first side plate (1101). A discrete distance between the fifth side plate (2101) and the first side plate (1101) may be less than 4 mm. Alternatively, a discrete distance between the fifth side plate (2101) and the first side plate (1101) may be less than 3 mm. Alternatively, a discrete distance between the fifth side plate (2101) and the first side plate (1101) may be less than 2 mm. Alternatively, a discrete distance between the fifth side plate (2101) and the first side plate (1101) may be less than 1 mm.

A length (see 1-2 of FIG. 12) to a lengthwise direction of the fifth side plate (2101) of the second cover member (2100) may not exceed 1.5 times of a length (see 1-1 of FIG. 12) to a lengthwise direction of the first side plate (1101) of first cover member (1100).

The second cover member (2100) may comprise an opening (2110) and a marking part (2120). However, the marking part (2120) may be omitted or changed from the second cover member (2100).

The opening (2110) may be formed at an upper plate (2101). The opening (2110) may expose the second lens module. The opening (2110) may be formed with a shape corresponding to that of the second lens module. The opening (2110) may be formed larger in size than a diameter of the second lens module to allow the second lens module to be assembled through the opening (2110). Meantime, a light introduced into through the opening (2110) may pass through the second lens module. At this time, the light having passed the second lens module may be obtained by the second image sensor as an image.

The marking part (2120) may be formed at an upper plate (2102) of second cover member (2100). The marking part (2120) may be so formed as to allow a worker to know directivity of the second cover member (2100) at a glance. In case of OIS lens driving device, the directivity is important during soldering to a PCB, such that the marking part (2120) may be so formed as to allow a worker to easily recognize the directivity of the OIS lens driving device. The marking part (2120) may be formed on a corner part at one side of the upper plate (2102).

The AF mover (2200) may be coupled with the second lens module. The AF mover (2200) may accommodate the second lens module to an inside thereof. An inside surface of AF mover (2200) may be coupled to an outside surface of second lens module. The AF mover (2200) may move integrally with the second lens module through an electromagnetic interaction with an OIS mover (2300) and/or a stator (2400). The AF mover (21200) may comprise a second bobbin (2210) and a second coil (2220). However, any one or more of the second bobbin (2210) and the second coil (2220) may be omitted or changed from the AF mover (2200).

The second bobbin (2210) may be disposed at an inside of a second housing (2310). The second bobbin (2210) may be accommodated into a through hole (2311) of the second housing (2310). The second bobbin (2210) may be coupled with the second lens module. To be more specific, an inside surface of second bobbin (2210) may be coupled with an outside surface of second lens module. The second bobbin (2210) may be coupled by the second coil (2220). A lower surface of second bobbin (2210) may be coupled with a second lower support member (2620). An upper surface of the second bobbin (2210) may be coupled with a second upper support member (2610). The second bobbin (2210) may move to an optical axis direction relative to the second housing (2310).

The second bobbin (2210) may comprise a through hole (2211) and a coil reception part (2212). However, any one or more of the through hole (2211) and the reception part (2212) may be omitted or changed from the second bobbin (2210).

The through hole (2211) may be formed at an inside of the second bobbin (2210). The through hole (2211) may be formed with upper/lower sides-opened shape. The through hole (2211) may be coupled with the second lens module. The through hole (2211) may be formed at an inside surface with a screw thread of a shape corresponding to that formed at an outside of the second lens module. That is, the through hole (2211) may be screw-coupled with the second lens module. An adhesive may be interposed between the second lens module and the second bobbin (2210). At this time, the adhesive may be an epoxy hardened by heat, UV or laser.

That is, the second lens module and the second bobbin (2210) may be coupled by a UV-hardening epoxy and/or heat-hardening epoxy.

The coil reception part (2212) may accommodate at least one portion of the second coil (2220). The coil reception part (2212) may be integrally formed with an outside surface of second bobbin (2210). Furthermore, the coil reception part (2212) may be continuously formed along an outside surface of second bobbin (2210) or may be spaced apart from the outside surface of second bobbin (2210) at a predetermined gap. For example, the coil reception part (2212) may be formed by allowing a portion of the outside surface of the second bobbin (2210) to be recessed in a shape corresponding to that of the second coil (2220). At this time, the second coil (2220) may be directly wound on the coil reception (2212). As a modification, the coil reception part (2212) may be formed by allowing an upper side or a lower side to be opened. At this time, the second coil (2220) may be inserted into and coupled with the coil reception part (2212) through the opened portion while being in a pre-wound state.

The second coil (2220) may be disposed at the second bobbin (2210). The second coil (2220) may be disposed at an outside surface of the second bobbin (2210). The second coil (2220) may be directly wound on an outside surface of second bobbin (2210). The second coil (2220) may mutually and electromagnetically interact with a second magnet unit (2320). The second coil (2220) may face the second magnet unit (2320). In this case, when a current is supplied to the second coil (2220) to allow forming a magnetic field about the second coil (2220), the second coil (2220) may move relative to the second magnet unit (2320) in response to the electromagnetic interaction between the second coil (2220) and the second magnet unit (2320). The second coil (2220) may move for AF driving. In this case, the second coil (2220) may be called an "AF coil".

The second coil (2220) may comprise a pair of lead cables (not shown) for power supply. The pair of lead cables at the second coil (2220) may be electrically connected to a second upper support member (2620). Each of the lead cables of the first coil (2220) may be respectively connected to third and fourth support units (2620a, 2620b). In this case, an electric power may be supplied to the second coil (2220) through the second upper support member (2620) electrically connected to the second PCB (2001) through a substrate (2410), a substrate part (2421) and an OIS support member (2700).

The OIS mover (2300) may move for OIS function. The OIS mover (2300) may be disposed at an outside of the AF mover (2200) to face the AF mover (2200). The OIS mover (2300) may move the AF mover (2200) or may move along with the AF mover (2200). The OIS mover (2300) may be movably supported by the stator (2400) and/or the second base (2500) disposed at a lower side. The OIS mover (2300) may be disposed at an inner space of the second cover member (2100).

The OIS mover (2300) may comprise a second housing (2310) and a second magnet unit (2320). However, any one or more of the second housing (2310) and the second magnet unit (2320) may be omitted or changed from the OIS mover (2300).

The second housing (2310) may be disposed at an outside of the second bobbin (2210). The second housing (2310) may be spaced apart from the first housing (1310) of the first camera module. The second housing (2310) may be spaced apart from the second bobbin (2210). At least one portion of the second housing (2310) may be formed with a shape corresponding to that of an inside surface of the second cover member (2100). Particularly, an outside surface of the second housing (2310) may be formed with a shape corresponding to that of an inside surface of lateral plate (2102) of the second cover member (2100). The second housing (2310) may take a cubic shape comprising four side surfaces. However, the shape of second housing (2310) may be formed with any shape as long as the second housing (2310) can be disposed inside the second cover member (2100). The second housing (2310) may be formed with an insulation material. The second housing (2310) may be formed with an injection in consideration of productivity. The second housing (2310), which is a moving part for OIS driving, may be spaced apart from the second cover member (2100) at a predetermined distance. An upper surface of second housing (2310) may be coupled with a second upper support member (2610). The second housing (2310) may be coupled at a lower side with a second lower support member (2620).

The second housing (2310) may comprise fifth to eighth side surfaces (2301, 2302, 2303, 2304). The second housing (2310) may comprise continuously disposed fifth to eighth side surfaces (2301, 2302, 2303, 2304). The eighth side surface (2304) may be opposite to the second side surface (2302).

The second housing (2310) may comprise a through hole (2311) and a magnet reception part (2312). However, any one or more of the through hole (1311) and the magnet reception part (2312) may be omitted or changed from the second housing (2310).

The through hole (2311) may be formed at an inside of the second housing (2310). The through hole (2311) may be opened at an upper side and a lower side. The through hole (2311) may be accommodated with the second bobbin (2210). The through hole (2310) may be movably disposed with the second bobbin (2210). The through hole (2310) may be formed with a shape corresponding to that of the second bobbin (2210).

The magnet reception part (2312) may be formed at a lateral surface of the second housing (2310). The magnet reception part (2312) may accommodate at least a portion of the second magnet unit (2320). An adhesive (not shown) may be interposed between the second magnet unit (2320) and the magnet reception part (2312). That is, the second magnet unit (2320) and the magnet reception part (2312) may be coupled by an adhesive. The magnet reception part (2312) may be disposed at an inside surface of second housing (2310). The magnet reception part (2312) may be formed by allowing a portion of an inside of the second housing (2310) to be outwardly recessed. In this case, the electromagnetic interaction with the second coil (2220) disposed at an inside of the second magnet unit (2320) may be advantageously implemented. The magnet reception part (2312) may be opened at a lower side. In this case, the electromagnetic interaction with the third coil (2422) disposed at a lower side of the second magnet unit (2320) may be advantageously implemented.

The magnet reception unit (2320) may be disposed at the second housing (2310). The second magnet part (2320) may be accommodated into the magnet reception part (2312) of second housing (2310). The magnet reception unit (2320) may mutually and electromagnetically interact with the second coil (2220). The magnet reception unit (2320) may face the second coil (2220). The magnet reception unit (2320) may move the second bobbin (2210) fixed by the second magnet unit (2320). The magnet reception unit (2320) may move the second coil (2220) for AF driving. In this case, the second magnet unit (2320) may be called an "AF magnet". Furthermore, the second magnet unit (2320) may move for OIS driving. In this case, the second magnet unit (2320) may be called an "OIS magnet". Thus, the second magnet unit (2320) may be called an "AF/OIS magnet".

The second magnet unit (2320) may comprise third to sixth magnets (2321, 2322, 2323, 2324). The second magnet unit (2320) may comprise third to sixth magnets (2321, 2322, 2323, 2324), each spaced apart from the other. The second magnet unit (2320) may comprise third to sixth magnets (2321, 2322, 2323, 2324), each symmetrically disposed. The second magnet unit (2320) may comprise third to sixth magnets (2321, 2322, 2323, 2324), each disposed on four corners of the second housing (2310). The second magnet unit (2320) may comprise a third magnet (2321) interposed between the fifth and sixth side surfaces (2301, 2302), a fourth magnet (2322) interposed between the sixth and seventh side surfaces (2302, 2303), a fifth magnet (2323) interposed between the seventh and eighth side surfaces (2303, 2304), and a sixth magnet (2324) interposed between the eighth and fifth side surfaces (2304, 2301).

The third to sixth magnets (2321, 2322, 2323, 2324) may be continuously disposed at a corner of the second housing (2310). The third to sixth magnets (2321, 2322, 2323, 2324), may be symmetrical about an optical axis of the second camera module. The third to sixth magnets (2321, 2322, 2323, 2324) may be so disposed as to allow same polarity to face an inside. The third to sixth magnets (2321, 2322, 2323, 2324) may be so disposed as to allow N poles to face inside. Alternatively, the third to sixth magnets (2321, 2322, 2323, 2324) may be so disposed as to allow S poles to face inside. The third to sixth magnets (2321, 2322, 2323, 2324) may take a cylindrical shape in which an inside surfaced is greater than an outside surface. In this case, the third to sixth magnets (2321, 2322, 2323, 2324) may be called "corner magnets".

The stator (2400) may be disposed at a lower side of AF mover (2200). The stator (2400) may be disposed at a lower side of OIS mover (2300). The stator (2400) can move the OIS mover (2300). At this time, the OIS mover (2300) may move along with the AF mover (2200). That is, the stator (2400) may move the AF mover (2200) and the OIS mover (2300).

The stator (2400) may comprise a substrate (2410) and a third coil part (2420). However, any one or more of the substrate (2410) and the third coil part (2420) may be omitted or changed from the stator (2400).

The substrate (2410) may be a flexible PCB, which is an FPCB (Flexible Printed Circuit Board). The substrate (2410) may be disposed at an upper surface of second base (2500). The substrate (2410) may be interposed between the second base (2500) and the third coil part (2420). The substrate (2410) may be electrically connected to the third coil (2422). The substrate (2410) may be electrically connected to the second coil (2220). The substrate (2410) may be electrically connected to the second coil (2220) through the OIS support member (2700) and the second upper support member (2610).

The substrate (2410) may comprise a through hole (2411) and a staircase part (2412). However, any one or more of the through hole (2411) and the staircase part (2412) may be omitted or changed from the substrate (2410).

The through hole (2411) may be formed at a center of the substrate (2410). The through hole (2411) may be so formed as to vertically penetrate the substrate (2410). The through hole (2411) may be overlapped with the second lens module to an optical axis direction. The through hole (2411) may pass a light through that has passed the second lens module.

The staircase part (2412) may be formed by bending one portion of the substrate (2410). The staircase part (2412) may be formed by bending one portion of the substrate (2410) to a lower side. At least one portion of the staircase part (2412) may be exposed to an outside. A lower end of the staircase part (2412) may be coupled with the second PCB (2001). The staircase part (2412) may be soldered to the second PCB (2001). The substrate (2410) may be electrically connected to the second PCB (2001) through the staircase part (2412).

The third coil part (2420) may be disposed at an upper surface of substrate (2410). The third coil part (2420) may be disposed at the second base (2500). The third coil part (2420) may be disposed opposite to the second magnet unit (2320). The third coil part (2420) may mutually and electromagnetically interact with the second magnet unit (2320). The third coil part (2420) may move the second magnet unit (2320) for OIS driving.

The third coil part (2420) may comprise a substrate part (2421) and a third coil (2422). However, any one or more of the substrate part (2421) and a third coil (2422) may be omitted or changed from the third coil part (2420).

The substrate part (2421) may be an FPCB. The substrate part (2421) may be formed with the third coil (2422) as a fine pattern coil (FPC). The substrate part (2421) may be disposed at an upper surface of substrate (2410). The substrate part (2421) may be electrically connected to the substrate (2410). The substrate part (2421) may be electrically connected to the third coil (2422).

The third coil (2422) may be formed with a fine pattern coil (FPC) on the substrate part (2421). The third coil (2422) may be disposed on the base (2500). The third coil (2422) may mutually and electromagnetically interact with the second magnet unit (2320). The third coil (2422) may be disposed opposite to the second magnet unit (2320). In this case, when a current is supplied to the third coil (2422) to form a magnetic field about the third coil (2422), the second magnet unit (2320) may move to the third coil (2422) through the electromagnetic interaction between the third coil (2422) and the second magnet unit (2320). The third coil (2422) may move the second magnet unit (2320) for OIS driving. In this case, the third coil (2422) may be called an "OIS coil".

The second base (2500) may be disposed at a lower side of second housing (2310). The second base (2500) may movably support the second housing (2310). The second base (2500) may be disposed on an upper surface of second PCB (2001). The second base (2500) may be coupled by a second infrared filter.

The second base (2500) may comprise an opening (2510), a terminal reception part (2520) and a sensor reception part (2530). However, any one or more of the opening (2510), the terminal reception part (2520) and the sensor reception part (2530) may be omitted or changed from the second base (2500).

The opening (2510) may be formed at a center of second base (2500). The opening (2510) may be so formed as to vertically pass through the second base (2500). The opening (2510) may be overlapped with the second lens module to an optical axis direction. The opening (2510) may pass through a light having passed the second lens module.

The terminal reception part (2520) may be formed at a lateral surface of second base (2500). The terminal reception part (2520) may be formed by allowing a portion of outside lateral surface of second base (2500) to be inwardly recessed. The terminal reception part (2520) may accommodate at least one portion of terminal part (2412) of substrate (2410). The terminal reception part (2520) may be formed with a width corresponding to that of the terminal part (2412).

The sensor reception part (2530) may be formed at an upper surface of second base (2500). The sensor reception part (2530) may be formed by allowing a portion of an upper surface of second base (2500) to be downwardly recessed. The sensor reception part (2530) may be formed with a groove. The sensor reception part (2530) may accommodate at least one portion of a Hall sensor (2800). The sensor reception part (2530) may be formed with a shape corresponding to that of the Hall sensor (2800). The sensor reception part (2530) may be formed with the number corresponding to that of the Hall sensor (2800). The sensor reception part (2530) may be formed with two pieces.

The second AF support member (2600) may be coupled to the second bobbin (2210) and to the second housing (2310). The second AF support member (2600) may elastically support the second bobbin (2210). The second AF support member (2600) may movably support the second bobbin (2210) relative to the second housing (2310). At least a portion of the second AF support member (2600) may have elasticity.

The second AF support member (2600) may comprise a second upper support member (2610) and a second lower support member (2620). However, any one or more of the second upper support member (2610) and the second lower support member (2620) may be omitted or changed from the second AF support member (2600).

The second upper support member (2610) may be coupled to an upper surface of second bobbin (2210) and to an upper surface of second housing (2310). The second upper support member (2610) may be electrically connected to the second coil (2220). The second upper support member (2610) may comprise third and fourth support units (2610a, 2610b). Each of the third and fourth support units (2610a, 2610b) may be coupled to a pair of lead cables of second coil (2220).

The second upper support member (2610) may comprise an external part (2611), an internal part (2612), a connection part (2613) and a coupling part (2614). However, any one or more of the external part (2611), the internal part (2612), the connection part (2613) and the coupling part (2614) may be omitted or changed from the second upper support member (2610).

The external part (2611) may be coupled to the second housing (2310). The external part (2611) may be coupled to an upper surface of second housing (2310).

The internal part (2612) may be coupled to the second bobbin (2210). The internal part (2612) may be coupled to an upper surface of second bobbin (2210).

The connection part (2613) may connect the external part (2611) and the internal part (2612). The connection part (2613) may elastically connect the external part (2611) and the internal part (2612). The connection part (2613) may possess elasticity.

The coupling part (2614) may be extended from the external part (2611). The coupling part (2614) may be extended from the external part (2611) to an outside. The coupling part (2614) may be disposed at four corner parts side of second housing (2310). The coupling part (2614) may be coupled to the OIS support member (2700).

The second lower support member (2620) may be coupled to a lower surface of second bobbin (2210) and to a lower surface of second housing (2310). The second lower support member (2620) may be integrally formed.

The second lower support member (2620) may comprise an external part (2621), an internal part (2622), a connection part (2623). However, any one or more of the external part (2621), the internal part (2622) and the connection part (2623) may be omitted or changed from the second lower support member (2620).

The external part (2621) may be coupled to the second housing (2310). The external part (2621) may be coupled to a lower surface of second housing (2310).

The internal part (2622) may be coupled to the second bobbin (2210). The internal part (2622) may be coupled to a lower surface of second bobbin (2210).

The connection part (2623) may connect the external part (2621) and the internal part (2622). The connection part (2623) may elastically connect the external part (2621) and the internal part (2622). The connection part (2623) may possess elasticity.

The OIS support member (2700) may movably support the second housing (2310). The OIS support member (2700) may movably support the OIS mover (2300) relative to the stator (2400). A lower end of OIS support member (2700) may be coupled to a third coil part (2420). An upper end of the OIS support member (2700) may be coupled to the second upper support member (2610). The OIS support member (2700) may comprise a plurality of wires. Alternatively, the OIS support member (2700) may comprise a plurality of leaf springs. At least a portion of the OIS support member (2700) may possess elasticity. The OIS support member (2700) may be formed with an electrically conductive member. The second coil part (2420) and the second upper support member (2610) may be electrically conducted by the conductive member. The OIS support member (2700) may be formed with four (4) pieces by being respectively disposed on four corner parts of second housing (2310).

The OIS support member (2700) and the second housing (2310) may be formed with a damper (not shown). The OIS support member (2700) and the second AF support member (2600) may be formed with a damper. The damper may inhibit a resonance phenomenon that may be generated in the course of AF/OIS feedback driving. Alternatively, as a modification, a cushion part (not shown) may be formed by changing, in shape, a portion of the OIS support member (2700) and/or the second AF support member (2600) to replace the damper. The cushion part may be formed by being bent or curved.

The Hall sensor (2800) may be used for OIS feedback function. The Hall sensor (2800) may be a Hall IC. The Hall sensor (2800) may detect a magnetic force of the second magnet unit (2320). The Hall sensor (2800) may detect movement of second housing (2310). The Hall sensor (2800) may detect the second magnet unit (2320) fixed to the second housing (2310). The Hall sensor (2800) may be electrically connected to the substrate (2410). The Hall sensor (2800) may be accommodated into the sensor reception part (2530) of second base (2500). The Hall sensor (2800) may detect the movement of second housing (2310) by way of x axis and y axis components by being formed in two pieces and mutually arranged at 90° relative to an optical axis.

The dual camera module according to the exemplary embodiments, as discussed above, can minimize the magnetic interference by arrangements and shapes of first to fourth magnet units (1320, 2320, 1410, 1420) and by arrangements and shapes of first to fourth shield members (1410, 1420, 1430, 1440).

However, by the design-wise request, at least one of the third and fourth magnet units (1410, 1420) and the first to fourth shield members (1410, 1420, 1430, 1440) may be omitted from the dual camera module according to the exemplary embodiments, and as a result, various exemplary embodiments may be implemented.

Hereinafter, the dual camera module according to first to seventh exemplary embodiments will be described with reference to the accompanying drawings. However, the dual camera module according to first to seventh exemplary embodiments are parts of various exemplary embodiments of dual camera module according to the present exemplary embodiments, and therefore, the scope of dual camera module according to the present exemplary embodiments are not limited thereby.

Figure 12:
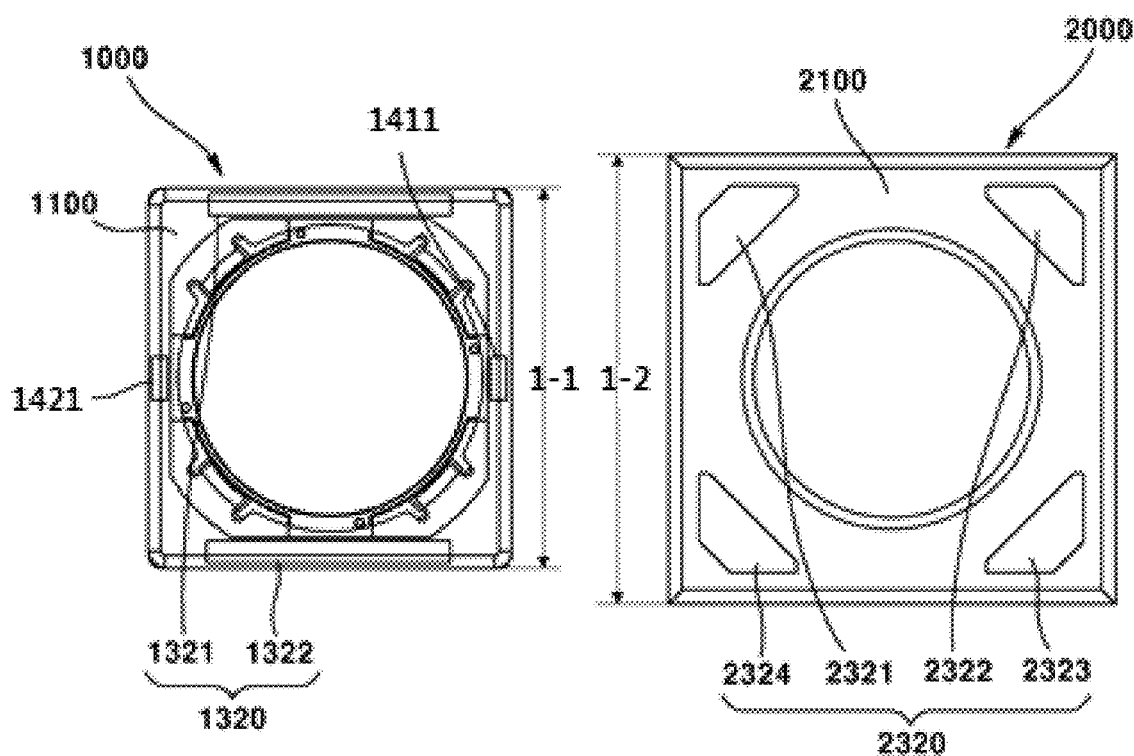
FIG. 12 is a perspective view of dual camera module seen from a flat surface according to a first exemplary embodiment of present invention.
Figure 14:
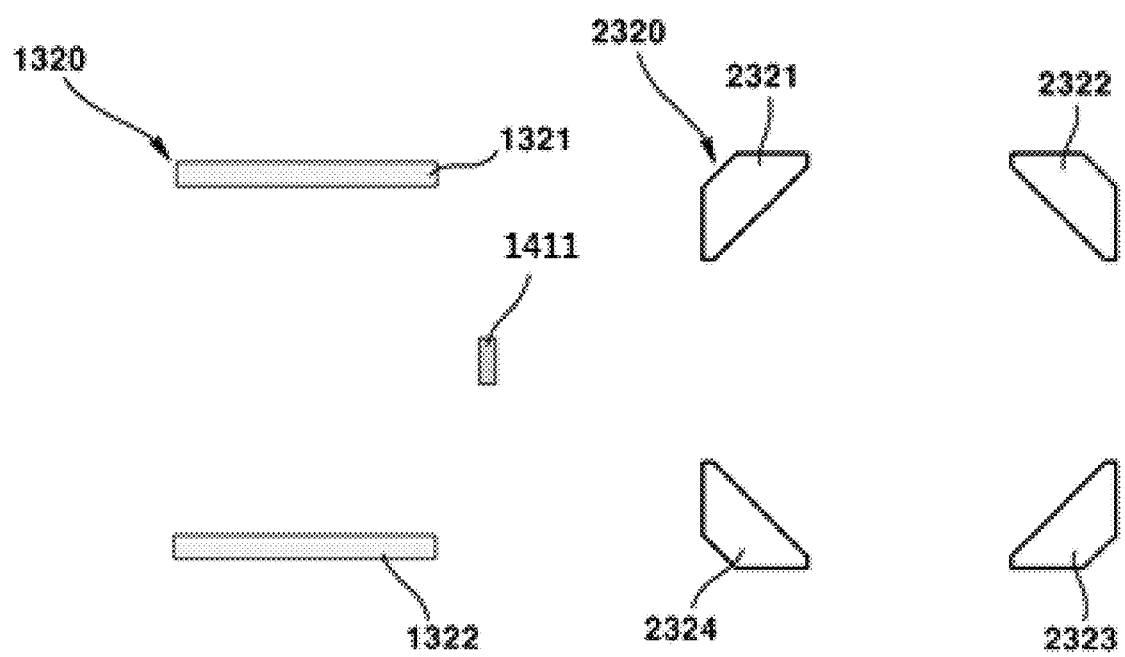
FIG. 14 is a conceptual view of a dual camera module according to a second exemplary embodiment of present invention.
Figure 15:
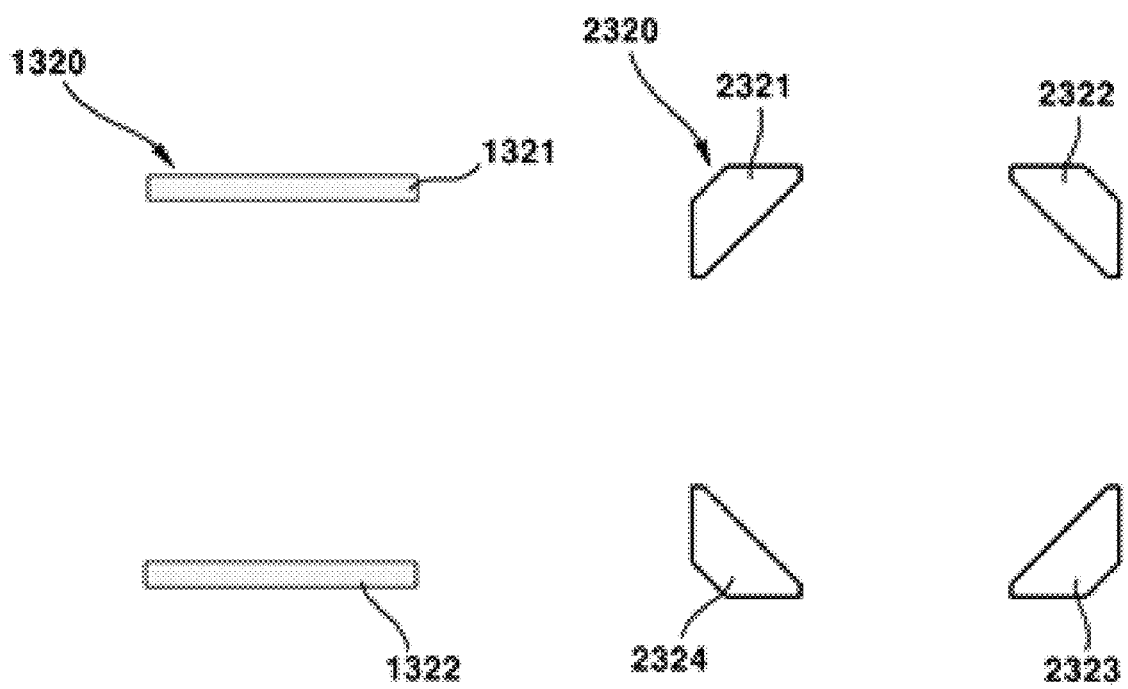
FIG. 15 is a conceptual view of a dual camera module according to a third exemplary embodiment of present invention.

Hereinafter, first, second and third exemplary embodiments will be described with reference to the drawings. FIG. 12 is a perspective view of dual camera module seen from a flat surface according to a first exemplary embodiment of present invention, FIG. 13 is a conceptual view of a dual camera module according to a first exemplary embodiment of present invention, FIG. 14 is a conceptual view of a dual camera module according to a second exemplary embodiment of present invention, and FIG. 15 is a conceptual view of a dual camera module according to a third exemplary embodiment of present invention.

The dual camera module according to first, second and third exemplary embodiments are the types of dual camera module removed of the first to fourth shield members (1410, 1420, 1430, 1440). When the magnetic interference is sufficiently restricted by arrangements and shapes of first to fourth magnet units (1320, 2320, 1410, 1420), the first to fourth shield members (1410, 1420, 1430, 1440) may be all omitted.

Figure 13:
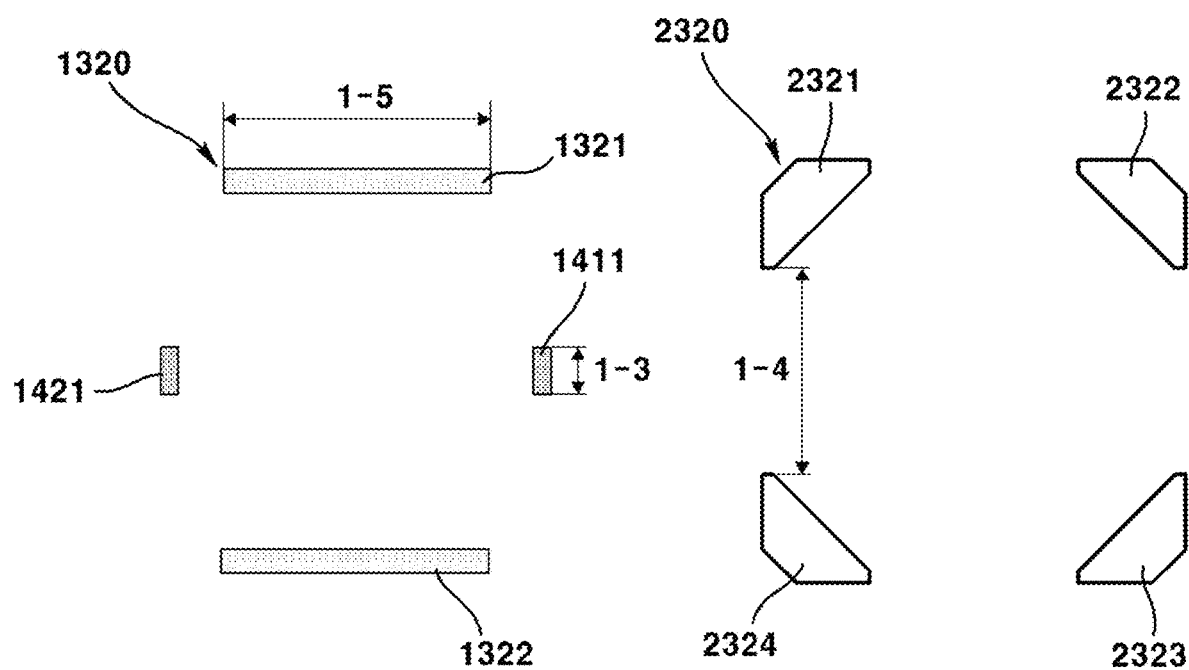
FIG. 13 is a conceptual view of a dual camera module according to a first exemplary embodiment of present invention.

The dual camera module according to the first exemplary embodiment is a case where all the first to fourth magnet units (1320, 2320, 1410, 1420) are present (see FIGS. 12 and 13). The dual camera module according to the second exemplary embodiment is a case where the fourth magnet units (1421) is absent.

In this case, the size of third magnet unit (1411) may be changed. The size of third magnet unit (1411) according to the second exemplary embodiment may be greater than that of the third magnet unit (1411) of the first exemplary embodiment. Alternatively, the size of third magnet unit (1411) according to the second exemplary embodiment may be smaller than that of the third magnet unit (1411) of the first exemplary embodiment. Even if the fourth magnet units (1421) is omitted as in the second exemplary embodiment and the third magnet unit (1411) is disposed, the flat plate magnet of AF camera module may reduce, to some degree, the influence affected on the corner magnet of the OIS camera module.

The dual camera module according to the third exemplary embodiment is a case where the third and fourth magnet units (1421, 1422) are omitted (see FIG. 15). In this case, an influence affected on a corner magnet of OIS camera module by the flat plate magnet of AF camera module may still be existent due to omission of the third magnet unit (1411). Hence, in the third exemplary embodiment, the discrete distance between the AF camera module and the OIS camera module may be more spaced apart than the abovementioned exemplary embodiment. Meantime, even in the third exemplary embodiment, when compared to a case where a same size of flat plate magnet as the first magnet (1321) is disposed on the second side surface (1302) of the first housing (1310), it can be seen that the influence affected on the corner magnet of the OIS camera module by the flat plate magnet of the AF camera module has been reduced.

Figure 16:
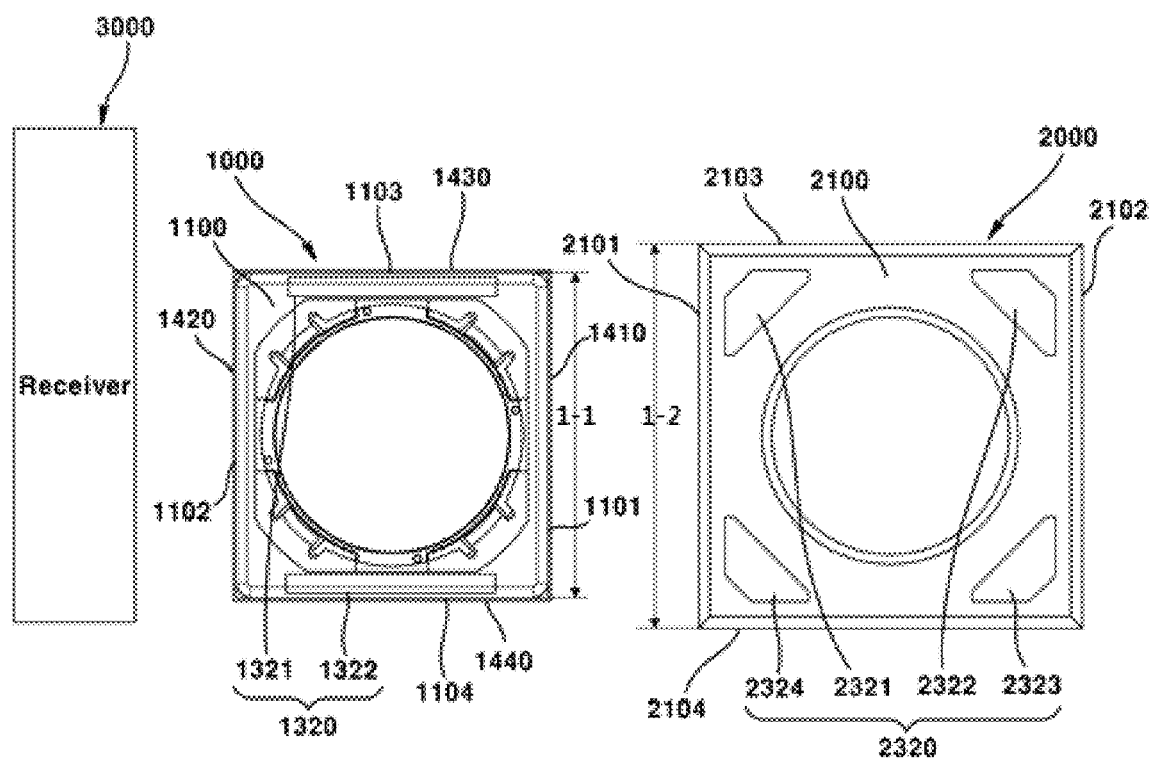
FIG. 16 is a plane view of a dual camera module according to a fourth exemplary embodiment of present invention.
Figure 17:
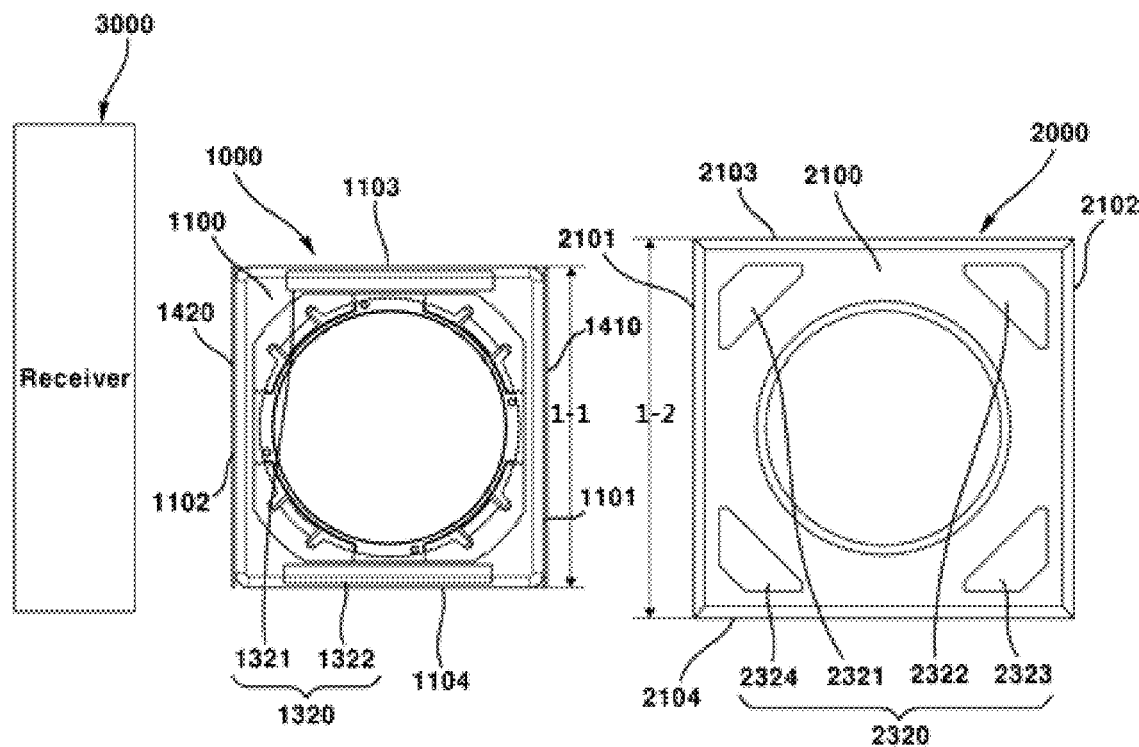
FIG. 17 is a plane view of a dual camera module according to a fifth exemplary embodiment of present invention.
Figure 18:
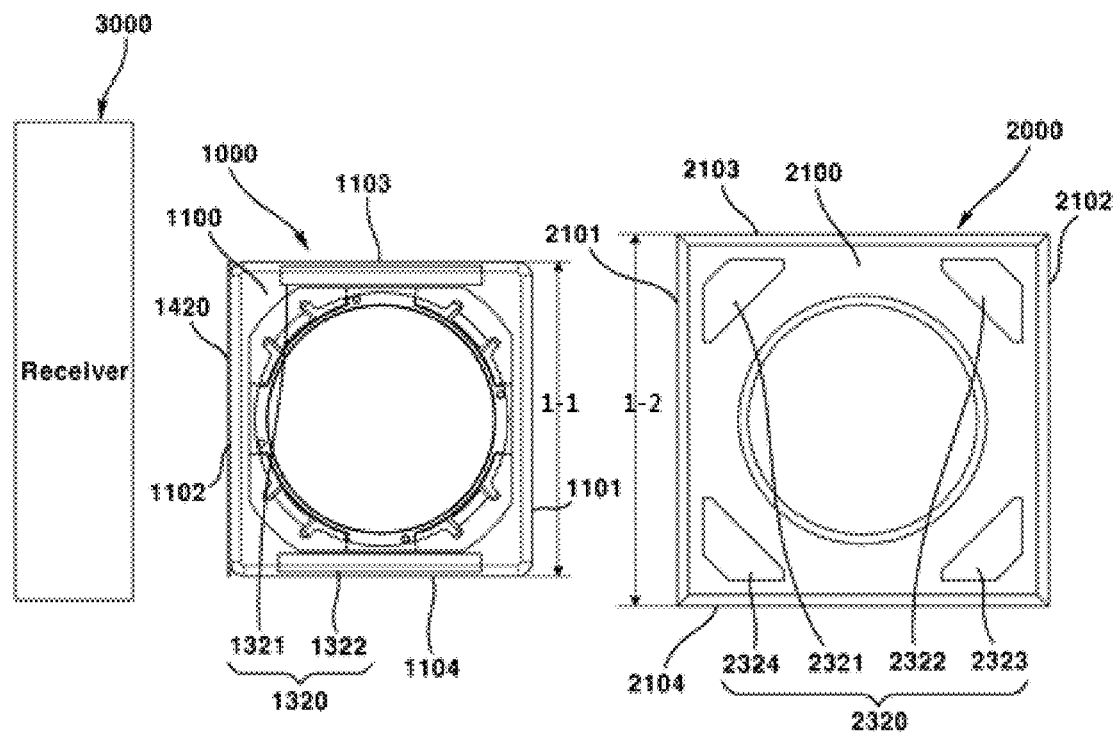
FIG. 18 is a plane view of a dual camera module according to a sixth exemplary embodiment of present invention.
Figure 19:
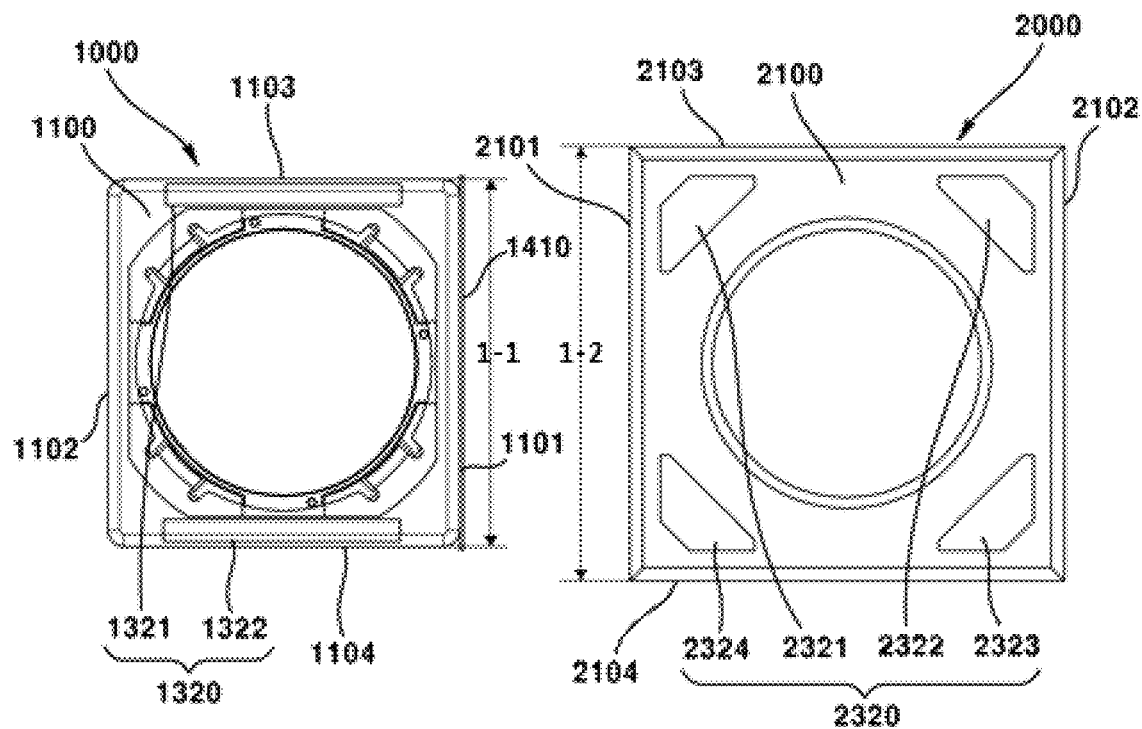
FIG. 19 is a plane view of a dual camera module according to a seventh exemplary embodiment of present invention.

Hereinafter, the fourth, fifth, sixth and seventh exemplary embodiments will be described with reference to the drawings. FIG. 16 is a plane view of a dual camera module according to a fourth exemplary embodiment of present invention, FIG. 17 is a plane view of a dual camera module according to a fifth exemplary embodiment of present invention, FIG. 18 is a plane view of a dual camera module according to a sixth exemplary embodiment of present invention, and FIG. 19 is a plane view of a dual camera module according to a seventh exemplary embodiment of present invention.

The dual camera module according to the fourth, fifth, sixth and seventh exemplary embodiments is a case where at least one of the first to fourth shield members (1410, 1420, 1430, 1440) is present. Furthermore, the dual camera module according to the fourth, fifth, sixth and seventh exemplary embodiments is a case where the third magnet unit (1410) and the fourth magnet unit (1420) are omitted.

When the magnet interference between the dual camera modules are not sufficiently restricted by the arrangements and shapes of the first to fourth magnet units (1320, 2320, 1410, 1420), or when the magnetic interference with the peripheral device such as the receiver (3000) is generated, the magnetic interference can be restricted by using at least one of the first to fourth shield members (1410, 1420, 1430, 1440).

In this case, there may be a situation where the magnetism of the first magnet unit (1320) is affected only on the second magnet unit (2320) of the second camera module (2000), and where the magnetism of the first magnet unit (1320) is affected only on the second magnet unit (2320) and the receiver (3000), such that a whole or a part of the second to fourth shield members (1420, 1430, 1440) may be omitted for reduction in material cost and for optical design.

The dual camera module according to the fourth exemplary embodiment is a case where all the first to fourth shield members (1410, 1420, 1430, 1440) are present (FIG. 16). The dual camera module according to the fifth exemplary embodiment is a case where the first and second shield members (1410, 1420) are present (FIG. 17). The dual camera module according to the sixth exemplary embodiment is a case where only the second shield member (1420) is present (FIG. 18). The dual camera module according to the seventh exemplary embodiment is a case where only first shield member (1410) is present (FIG. 19).

Although the present disclosure has been explained with all constituent elements forming the exemplary embodiments of the present disclosure being combined in one embodiment, or being operated in one embodiment, the present disclosure is not limited thereto. That is, all elements may operate by allowing one or more elements to be selectively combined as long as within the scope of object of the invention.

Furthermore, terms such as "includes", "including", "have", "having", "comprises" and/or "comprising" as used herein mean that the relevant elements are embedded, unless otherwise described, such that the mentioned elements are not excluded but may be further included.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The foregoing explanations are intended only to be illustrative of the technical ideas of the present invention, and therefore, it should be appreciated by the skilled in the art that various modifications and amendments to the above examples may be made without deviating from the scope of protection of the invention.

The exemplary embodiments disclosed by the present invention are not to limit the technical ideas of the present invention but to explain the present invention, and therefore, the technical ideas of present invention are not to be limited by the exemplary embodiments. The scope of protection of the present invention should be interpreted by the following claims and all technical ideas within the equivalent scope should be interpreted as being included in the scope of right of the present invention.

The invention claimed is:

1. A camera device comprising:
a first camera module comprising a first cover member, a first bobbin disposed in the first cover member, and a first magnet unit disposed between the first cover member and the first bobbin;
a second camera module comprising a second cover member, a second bobbin disposed in the second cover member, and a second magnet unit disposed between the second cover member and the second bobbin; and
a second shield member formed as a metal,
wherein the first cover member comprises a first lateral plate facing the second cover member, a second lateral plate opposite to the first lateral plate, and third and fourth lateral plates opposite to each other,
wherein the first magnet unit comprises a first magnet disposed between the third lateral plate of the first cover member and the first bobbin, and a second magnet disposed between the fourth lateral plate of the first cover member and the first bobbin,
wherein the second magnet unit comprises third to sixth magnets disposed on four corner areas of the second cover member, respectively, and
wherein the second shield member is disposed outside the second lateral plate of the first cover member.

2. The camera device of claim 1, comprising a first shield member formed as a metal,
wherein the first shield member is disposed on the first lateral plate of the first cover member.

3. The camera device of claim 1, comprising third and fourth shield members formed as a metal,
wherein the third shield member is disposed outside the third lateral plate of the first cover member, and
wherein the fourth shield member is disposed outside the fourth lateral plate of the first cover member.

4. The camera device of claim 3, wherein the second shield member and the third shield are connected, and
wherein the second shield member and the fourth shield member are connected.

5. The camera device of claim 3, wherein the third shield member is a flat plate shape and is disposed to contact with the third lateral plate of the first cover member, and
wherein the fourth shield member is a flat plate shape and is disposed to contact with the fourth lateral plate of the first cover member.

6. The camera device of claim 1, wherein the second shield member is formed as a magnetic substance.

7. The camera device of claim 1, wherein the second shield member is a flat plate shape and is disposed to contact with the second lateral plate of the first cover member.

8. The camera device of claim 1, wherein the first and second magnets are symmetrical based on an optical axis, and
wherein each of the first and second magnets has a flat plate shape.

9. The camera device of claim 1, wherein the third to sixth magnets are symmetrical based on an optical axis, and
wherein each of the third to sixth magnets has a pillar shape with an inner lateral surface greater than an outer lateral surface.

10. The camera device of claim 1, wherein the first camera module comprises a first housing disposed between the first cover member and the first bobbin, and
wherein the first and second magnets are disposed on the first housing.

11. The camera device of claim 1, wherein the second camera module comprises a second housing disposed between the second cover member and the second bobbin, and
wherein the third to sixth magnets are disposed on the second housing.

12. The camera device of claim 1, wherein the first camera module comprises a first coil disposed on the first bobbin, and
wherein the second camera module comprises a second coil disposed on the second bobbin.

13. The camera device of claim 1, wherein the second camera module comprises a base coupled with the second cover member, and a third coil disposed on the base and configured to electromagnetically interact with the second magnet unit, and
wherein the second bobbin is configured to be moved in a direction perpendicular to an optical axis or tilted by an electromagnetic interaction between the second magnet unit and the third coil.

14. The camera device of claim 1, wherein the second cover member comprises a fifth lateral plate facing the first cover member, and
wherein a discrete distance between the first lateral plate and the fifth lateral plate is within 4 mm.

15. The camera device of claim 1, wherein each of the first and second cover members is formed as a non-magnetic substance.

16. The camera device of claim 1, wherein a size of the second cover member is different from a size of the first cover member.

17. An optical apparatus comprising:
a main body;
the camera device of claim 1 disposed on the main body; and
a display part disposed on the main body and outputting an image photographed by the camera device.

18. A camera device comprising:
a first camera module comprising a first cover member, and a first magnet unit disposed in the first cover member;
a second camera module comprising a second cover member, and a second magnet unit disposed in the second cover member; and
a second shield member formed as a metal,
wherein the first cover member comprises a first lateral plate facing the second cover member, a second lateral plate opposite to the first lateral plate, and third and fourth lateral plates opposite to each other, wherein the first magnet unit comprises first and second magnets overlapped with each other in a direction from the third lateral plate to the fourth lateral plate, wherein the second magnet unit comprises third to sixth magnets disposed on four corner areas of the second cover member, respectively, and wherein the second shield member is disposed outside the second lateral plate of the first cover member.

19. The camera device of claim 18, comprising a first shield member formed as a metal, wherein the first shield member is disposed on the first lateral plate of the first cover member.

20. The camera device of claim 18, comprising third and fourth shield members formed as a metal, wherein the third shield member is disposed outside the third lateral plate of the first cover member, and wherein the fourth shield member is disposed outside the fourth lateral plate of the first cover member.

* * * * *